United States Patent
Rajadurai et al.

(10) Patent No.: US 12,335,727 B2
(45) Date of Patent: Jun. 17, 2025

(54) METHODS AND SYSTEMS FOR AUTHENTICATING DEVICES USING 3GPP NETWORK ACCESS CREDENTIALS FOR PROVIDING MEC SERVICES

(71) Applicant: Samsung Electronics Co., Ltd., Suwon-si (KR)

(72) Inventors: Rajavelsamy Rajadurai, Bangalore (IN); Nishant Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 17/801,162

(22) PCT Filed: Feb. 19, 2021

(86) PCT No.: PCT/KR2021/002156
§ 371 (c)(1),
(2) Date: Aug. 19, 2022

(87) PCT Pub. No.: WO2021/167417
PCT Pub. Date: Aug. 26, 2021

(65) Prior Publication Data
US 2023/0070253 A1    Mar. 9, 2023

(30) Foreign Application Priority Data

Feb. 20, 2020  (IN) .............................. 202041007403
Feb. 18, 2021  (IN) ............................. 2020 41007403

(51) Int. Cl.
*H04W 12/06*    (2021.01)
(52) U.S. Cl.
CPC ................................ *H04W 12/068* (2021.01)
(58) Field of Classification Search
None
See application file for complete search history.

(56) References Cited

U.S. PATENT DOCUMENTS

| | | | |
|---|---|---|---|
| 10,110,495 B1 * | 10/2018 | Sabella | H04M 15/93 |
| 11,595,369 B2 * | 2/2023 | Allo | H04L 63/0428 |
| 11,889,308 B2 * | 1/2024 | Guo | H04W 12/041 |
| 2017/0201585 A1 | 7/2017 | Doraiswamy et al. | |

(Continued)

FOREIGN PATENT DOCUMENTS

| | | |
|---|---|---|
| IN | 202117044076 A | 1/2022 |
| KR | 10-2020-0007754 A | 1/2020 |
| WO | 2017/100640 A1 | 6/2017 |

OTHER PUBLICATIONS

T. Taleb, K. Samdanis, B. Mada, H. Flinck, S. Dutta and D. Sabella, "On Multi-Access Edge Computing: A Survey of the Emerging 5G Network Edge Cloud Architecture and Orchestration," in IEEE Communications Surveys & Tutorials, vol. 19, No. 3, pp. 1657-1681, thirdquarter 2017. (Year: 2017).*

(Continued)

*Primary Examiner* — Kari L Schmidt
(74) *Attorney, Agent, or Firm* — Jefferson IP Law, LLP

(57) ABSTRACT

Methods and systems for authenticating devices using 3GPP network access credentials for providing MEC services. A device is configured to receive MEC services from an EAS through 5G S A or NSA architecture. The device is authenticated by an ECS, which involves validating a MAC generated by the device. The MAC is validated using an edge authentication key, which is generated based on 3GPP network access security credentials of the device. The device is authorized by an EES to receive MEC services, which involves successful registration of the device with the EES and the EES providing credentials to the device for accessing an EAS providing desired MEC services. The EAS provides the desired MEC services to the device if the device provides credentials to the EAS, which are same as those provided to the device by the EES.

15 Claims, 19 Drawing Sheets

(56) References Cited

U.S. PATENT DOCUMENTS

| | | | | |
|---|---|---|---|---|
| 2019/0124070 | A1* | 4/2019 | Engan | H04L 9/3247 |
| 2019/0138934 | A1* | 5/2019 | Prakash | G06F 18/2148 |
| 2019/0149990 | A1* | 5/2019 | Wang | H04W 12/0471 |
| | | | | 370/329 |
| 2020/0007414 | A1* | 1/2020 | Smith | H04L 67/12 |
| 2020/0008044 | A1* | 1/2020 | Poornachandran | |
| | | | | H04L 41/5019 |
| 2020/0178198 | A1* | 6/2020 | Ding | H04W 60/04 |
| 2020/0359218 | A1* | 11/2020 | Lee | H04M 15/55 |
| 2020/0389531 | A1 | 12/2020 | Lee et al. | |
| 2021/0099976 | A1* | 4/2021 | Mueck | H04W 72/04 |
| 2021/0111953 | A1* | 4/2021 | Hall | H04L 67/563 |
| 2021/0136177 | A1* | 5/2021 | Hall | H04L 41/5051 |
| 2021/0136870 | A1* | 5/2021 | Panchal | H04L 67/14 |
| 2021/0144517 | A1* | 5/2021 | Guim Bernat | H04L 41/0869 |
| 2021/0352113 | A1* | 11/2021 | Sodagar | H04N 21/2225 |
| 2021/0409939 | A1* | 12/2021 | Baskaran | H04W 60/04 |
| 2022/0086218 | A1* | 3/2022 | Sabella | H04M 15/66 |
| 2023/0037031 | A1* | 2/2023 | Wang | H04W 8/08 |
| 2024/0129723 | A1* | 4/2024 | Kunz | H04W 12/041 |
| 2024/0298286 | A1* | 9/2024 | Xu | H04W 48/18 |

OTHER PUBLICATIONS

A. Ksentini and P.A. Frangoudis, "Toward Slicing-Enabled Multi-Access Edge Computing in 5G," in IEEE Network, vol. 34, No. 2, pp. 99-105, Mar./Apr. 2020. (Year: 2020).*

P. Ranaweera, A. D. Jurcut and M. Liyanage, "Realizing Multi-Access Edge Computing Feasibility: Security Perspective," 2019 IEEE Conference on Standards for Communications and Networking (CSCN), Granada, Spain, 2019, pp. 1-7. (Year: 2019).*

C.-Y. Li et al., "Transparent AAA Security Design for Low-Latency MEC-Integrated Cellular Networks, " in IEEE Transactions on Vehicular Technology, vol. 69, No. 3, pp. 3231-3243, Mar. 2020, (Year: 2020).*

3rd Generation Partnership Project; Technical Specification Group Services and System Aspects; Study on Security Aspects of Enhancement of Support for Edge Computing in 5GC (Release 17), 3GPP TR 33.839 V0.2.0, S3-202764, Oct. 23, 2020, XP051946200.

Sami Kekki et al., MEC in 5G networks, ETSI White Paper No. 28, Jun. 30, 2018, XP055722790.

Extended European Search Report dated Jun. 14, 2023, issued in European Patent Application No. 21756568.8.

3rd Generation Partnership Project; Technical Specification Group Services and System Aspects; Authentication and key management for applications based on 3GPP credentials in 5G (AKMA) (Release 16), 3GPP TS 33.535 V0.2.0, Jan. 2, 2020.

3rd Generation Partnership Project; Technical Specification Group Services and System Aspects; Study on application architecture for enabling Edge Applications; (Release 17), 3GPP TR 23.758 V17.0.0, Dec. 19, 2019.

3rd Generation Partnership Project; Technical Specification Group Services and System Aspects; Study on authentication and key management for applications based on 3GPP credential in 5G (Release 16), 3GPP TR 33.835 V16.0.0, Dec. 31, 2019.

3rd Generation Partnership Project; Technical Specification Group Services and System Aspects; S3-210654—Study on Security Aspects of Enhancement of Support for Edge Computing in 5GC (Release 17), 3GPP TR33.839 V0.4.0, Jan. 2021.

Indian Office Action dated Feb. 4, 2022, issued in Indian Application No. 202041007403.

International Search Report dated May 25, 2021, issued in International Application No. PCT/KR2021/002156.

* cited by examiner

METHODS AND SYSTEMS FOR AUTHENTICATING DEVICES USING 3GPP NETWORK ACCESS CREDENTIALS FOR PROVIDING MEC SERVICES

CROSS-REFERENCE TO RELATED APPLICATION(S)

This application is a U.S. National Stage application under 35 U.S.C. § 371 of an International application number PCT/KR2021/002156, filed on Feb. 19, 2021, which is based on and claims priority of an Indian provisional patent application number 202041007403, filed on Feb. 20, 2020, in the Indian Intellectual Property Office, and of an Indian complete patent application number 202041007403, filed on Feb. 18, 2021, in the Indian Intellectual Property Office, the disclosure of each of which is incorporated by reference herein in its entirety.

TECHNICAL FIELD

Embodiments herein relate to edge computing services, and more particularly to methods and systems for authenticating and authorizing devices using network access security credentials stored in the devices, for providing edge computing services to the devices.

BACKGROUND ART

Edge Computing (or Multi-access Edge Computing (MEC)) is a network architecture concept that enables cloud computing capabilities and provides service environments, which are deployed close to user devices (such as User Equipment (UE)). MEC promises several advantages such as lower latency, higher bandwidth, reduced backhaul traffic and prospects for new services compared to the cloud environments. With the advent of Edge computing capabilities, applications can be more responsive and provide features, which were not possible without the low latency and fast processing capabilities provided by the Edge computing systems. Applications such as Virtual Reality (VR) gaming and network assisted processing rely on Edge computing capabilities. While certain features of the applications may still be provided without the Edge computing systems, certain features may not be serviceable without Edge computing.

The Edge computing systems provided by a service provider, such as Mobile Network Operator (MNO), are currently, not ubiquitous due to operational and financial constraints. In order to leverage the capabilities and the features provided by the Edge computing systems, an application needs be aware of capabilities and features of Edge computing systems at its disposal. The awareness allows the application to enable or disable features which rely on the capabilities and the features provided by the Edge computing systems. The availability of Edge computing systems can change dynamically due to multiple reasons. Such changes need to be notified to the applications to enable the applications to fine-tune the features of the applications. For instance, the availability of Edge applications may be dependent on location of the device in which the application is installed, and content available at the edge.

DISCLOSURE OF INVENTION

Technical Problem

Currently, $3^{rd}$ Generation Partnership Project (3GPP) is working on Authentication and Key Agreement for Applications (AKMA). AKMA is a network service that is intended to support authentication and key management using 3GPP network access credentials in $5^{th}$ Generation (5G) communication system, for third-party and/or 3GPP applications and services. AKMA is considered as an authentication and key agreement service, wherein access to an application function/server and establishment of secure interface between the user device and the Application Function (AF) is based on established network access security credentials (established during primary authentication). The application provider (Application Function or Application Server) which uses AKMA, delegates the authentication of the user device to the Home Public Land Mobile Network (HPLMN) (MNO). There is a challenge in devising a mechanism that can be used for enabling the user devices to be authenticated and authorized using established network access security credentials for the usage of Edge Computing Service.

Solution to Problem

The principal object of the embodiments herein is to disclose methods and systems for authenticating and authorizing a device using $3^{rd}$ Generation Partnership Project (3GPP) Network access security credentials for providing Edge Computing or Multi-access Edge Computing (MEC) services to the device through a $5^{th}$ Generation (5G) Standalone (SA) architecture and/or a 5G Non-Standalone (NSA) network architecture.

Another object of the embodiments herein is to authenticate the device, using an Edge Configuration Server (ECS), to provision MEC services to the device, wherein the authentication involves validating, using an edge authentication key, a Message Authentication Code (MAC) generated by the device, wherein the edge authentication key is generated based on to $3^{rd}$ Generation Partnership Project (3GPP) network access security credentials of the device.

Another object of the embodiments herein is to authorize the device, using an Edge Enabler Server (EES), to enable the device to receive an intended MEC service, wherein the authorization involves successful registration of the device with the EES and reception of credentials to access an Edge Application Server (EAS) providing the intended MEC service.

Another object of the embodiments herein is to provide, by the EAS, the intended MEC service to the device if the EAS is able to validate the device, wherein the device is validated by the EAS using the credentials provided by the EES.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

Figure 1:
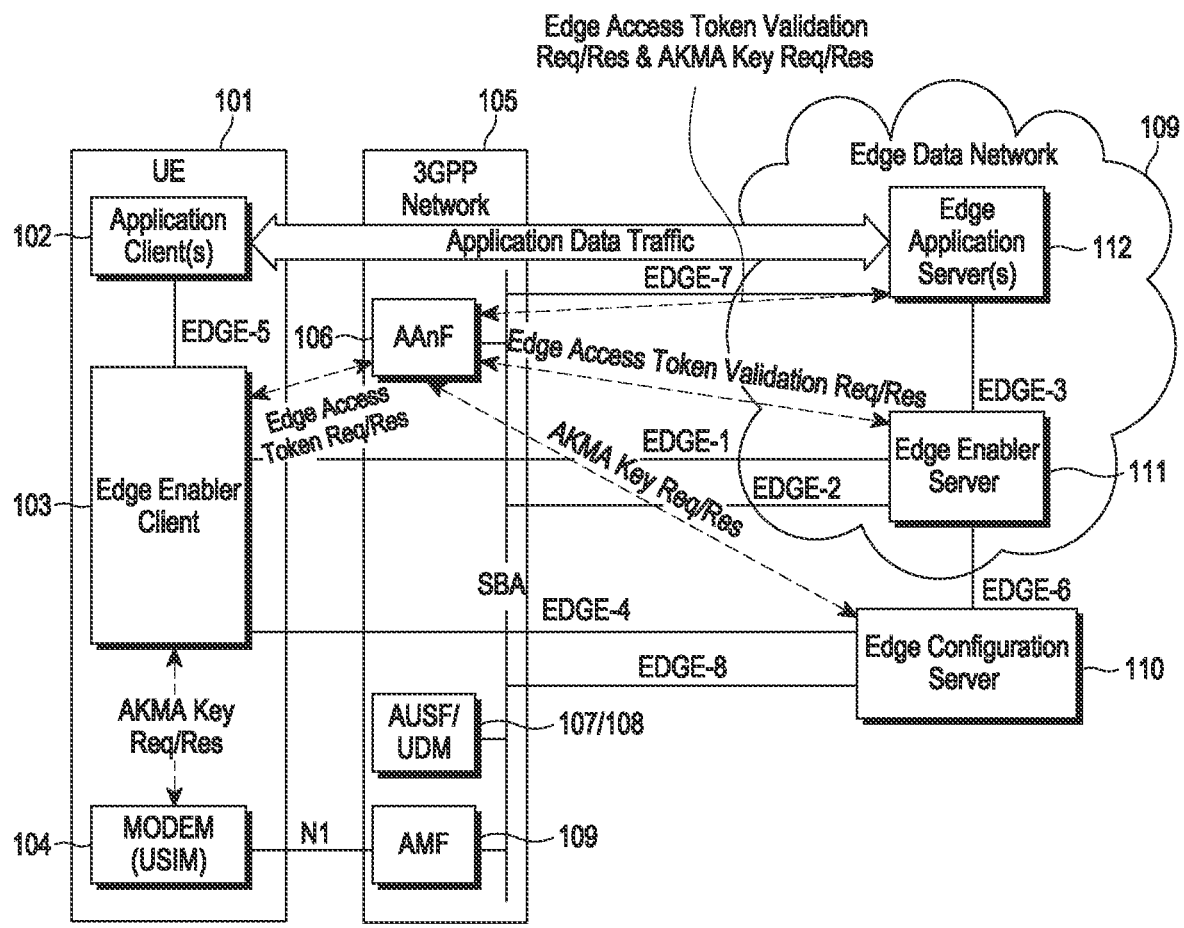
FIG. 1 depicts an example architecture for rendering MEC services to a device through a 5G network with SA architecture, wherein an AAnF acts as an Open Authorization Server for rendering of the MEC services to the device, according to embodiments as disclosed herein.

Accordingly, the embodiments provide methods and systems for providing Multi-access Edge Computing (MEC) services to a device through a $5^{th}$ Generation (5G) Standalone (SA) and/or a 5G Non-Standalone (NSA) network architecture. The MEC services are provided to the device after the device is authenticated and authorized using $3^{rd}$ Generation Partnership Project (3GPP) Network access security credentials of the device. In an embodiment, the device can be authenticated by an Edge Configuration Server (ECS) by validating a Message Authentication Code (MAC) generated by the device. In an embodiment, the ECS can validate the MAC using an edge authentication key, wherein the edge authentication key is generated based on the 3GPP network access security credentials of the device.

In an embodiment, the device is authorized to receive the MEC services if the device is able to successfully register with an Edge Enabler Server (EES). The EES can register the device if the device is able to provide a valid access token to the EES during the registration procedure. In an embodiment, EES can provide security policies pertaining to an Edge Application Server (EAS), which is found to be providing the MEC services to the device. The device can also receive credentials to access the EAS providing the MEC services to the device. In an embodiment, the credentials can be EAS access tokens or symmetric key pertaining to the EAS. The EES can send the security policies pertaining to the EAS and the credentials to access the EAS providing the MEC services, if the registration with the EES is successful and the device is able to discover, using the EES, the EAS providing the MEC services.

In an embodiment, the device can send a MEC service request to the EAS for availing the desired MEC services from the EAS. The device can send access credentials to the EAS in the MEC service request. The EAS can provide the MEC services to the device if the access credentials received by the EAS in the MEC service request are verified. In an embodiment, the verification is successful if the access credentials received by the EAS in the MEC service request match the access credentials provided by the EES to the device.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for authenticating and authorizing a device using $3^{rd}$ Generation Partnership Project (3GPP) Network access security credentials for providing Edge Computing or Multi-access Edge Computing (MEC) services to the device. The MEC services are provided to the device by an Edge Application Server (EAS) through a 5$^{th}$ Generation (5G) network having Standalone (SA) architecture or Non-Standalone (NSA) architecture. The device is authenticated by an Edge Configuration Server (ECS), in response to a provisioning request from the device to avail MEC services. The authentication involves validating the device using an edge authentication key. A Message Authentication Code (MAC) generated by the device is validated using the edge authentication key. The edge authentication key is generated based on the 3$^{rd}$ Generation Partnership Project (3GPP) network access security credentials of the device.

The device is authorized by an Edge Enabler Server (EES), for enabling the device to avail intended MEC services from the EAS. The device can be authorized to avail the intended MEC services only if the device has been authenticated by the EES. The authorization involves successful registration of the device with the EES, and the EES providing credentials to the device for enabling the device to access the EAS providing the intended MEC services. The EAS provides the intended MEC service to the device if the EAS is able to validate the device. The EAS validates the device, based on the authenticity verification mechanism used. The authenticity verification mechanism being one of: verification of message authentication code (MAC or MAC-I) and token (for example, OAUTH token).

In case of message authentication code verification, the UE (client) generates the message authentication code using the security credential it established with the server on the request message. On receiving the MAC-I from the UE, the server (for example, ECS) also generates the message authentication code using the security credential in its possession for the UE. If the received MAC-I and the generated MAC-I are same/equal, then the server verified the authenticity of the message requested. In case of token based mechanism, the client obtains the token from the server, which is in possession of the authorization information of the UE and provide token based on the authorization information after authenticating the UE. In the service request message the UE includes the obtained token to obtain service from the network, for which the UE is authorized. The ECS can determine that the token, received in the service registration request, is valid, by ensuring the integrity of the token by verifying the signature using token issuer's public key or checking the MAC value using the shared secret. If integrity check is successful, then the claims in the token are verified by checking one of: the claim in the access token matches UE's own identity and the scope matches the requested service operation.

Referring now to the drawings, and more particularly to FIGS. 1 through 13, where similar reference characters denote corresponding features consistently throughout the figures, there are shown preferred embodiments.

FIG. 1 depicts an example architecture for rendering MEC services to a device 101 through a 5G network with SA architecture, wherein an Authentication and Key Agreement for Applications (AKMA) Anchor Function (AAnF) 106 acts as an Open Authorization Server for rendering of the MEC services to the device, according to embodiments as disclosed herein. As depicted in FIG. 1, the architecture comprises a User Equipment (UE) (101), a 3GPP network 105, an Edge Data Network (EDN) 109, and an Edge Data Network Configuration Server (EDN CS) or ECS 110. The example depicts the UE (101) as the device 101. The UE 101 receives MEC services from elements in the EDN 109.

The UE 101 comprises at least one application client 102, an Edge Enabler Client (EEC) 103, and a Modem 104. The at least one application client 102 can refer to at least one edge application installed in the UE 101. The 3GPP network 105 in the architecture is the 5G network with SA architecture. The 3GPP network 105 comprises the AAnF 106, an Authentication Server Function (AUSF) 107, Unified Data Management (UDM) 108, and an Access and Mobility Function (AMF) 109. The EDN 109 comprises an EES 111 and at least on EAS 112. The EAS 112 provides at least one MEC service to the UE 101.

The Modem 104 in the UE 101 can store network access security credentials such as subscription credentials or User Services Identity Module (USIM) credentials (credentials stored in the memory of the USIM). The network access security credentials can be referred to as 3GPP network access security credentials. The 3GPP network access security credentials can be utilized for MEC user (device (UE 101)) authentication and authorization. The ECS 110 or AAnF 106 issues/derives temporary keys (such as access tokens/security keys), after the authentication procedure, for authorizing the UE 101 to access to the EES 111. The temporary keys can be referred to as EES tokens.

If the AAnF 106 issues/derives the temporary keys (EES access tokens), Mobile Network Operators (MNOs) or 3GPP network operators have the capability to control whether or not the UE 101 may access the EES 111. It can be assumed that an Edge (MEC) network may include multiple EESs. Each EES 111 can be owned by an Edge (MEC) service provider.

The terms "validation" or "validate" and "verification" or "verify" have been used interchangeably. The terms "Edge Data Network Configuration Server (EDN CS)" and "Edge Configuration Server (ECS)" have been used interchangeably. The terms "Multi-access Edge Computing (MEC)", "Mobile Edge Computing (MEC)" and "Edge Computing (EC)" have been used interchangeably.

1$^{st}$ embodiment: This embodiment is represented in the architecture depicted in FIG. 1. In this embodiment the AAnF (AKMA Anchor Function) 106 is configured to manage security credentials creation, distribution and management. The AAnF 106 in a part of the Home Public Land Mobile Network (HPLMN). The AAnF 106 acts as the Edge Open Authorization or Key management entity. The AAnF 106 is controlled by the MNOs. As such, the MNOs can manage the accessing of MEC services by the UE 101 from the EAS 112. The "highlighted dotted lines" in FIG. 1 indicate security service offered/obtained between the entities.

The AAnF 106 issues the EES tokens to authorize the UE 101 to register with the EES 111 and discover an EAS 112 that is providing the MEC services intended by the UE 101.

The EES 111 verifies the EES tokens, received from the UE 101, with the AAnF 106. The AAnF 106 provides EAS access credentials, pertaining to the EAS 112 providing the intended MEC services, to the EES 111. These access credentials allow the UE 101 to access the EAS 112 for availing MEC services. The EAS 112 verifies the EAS access credentials, received from the UE 101, with the AAnF 106, for rendering the MEC services to the UE 101.

Figure 2A:
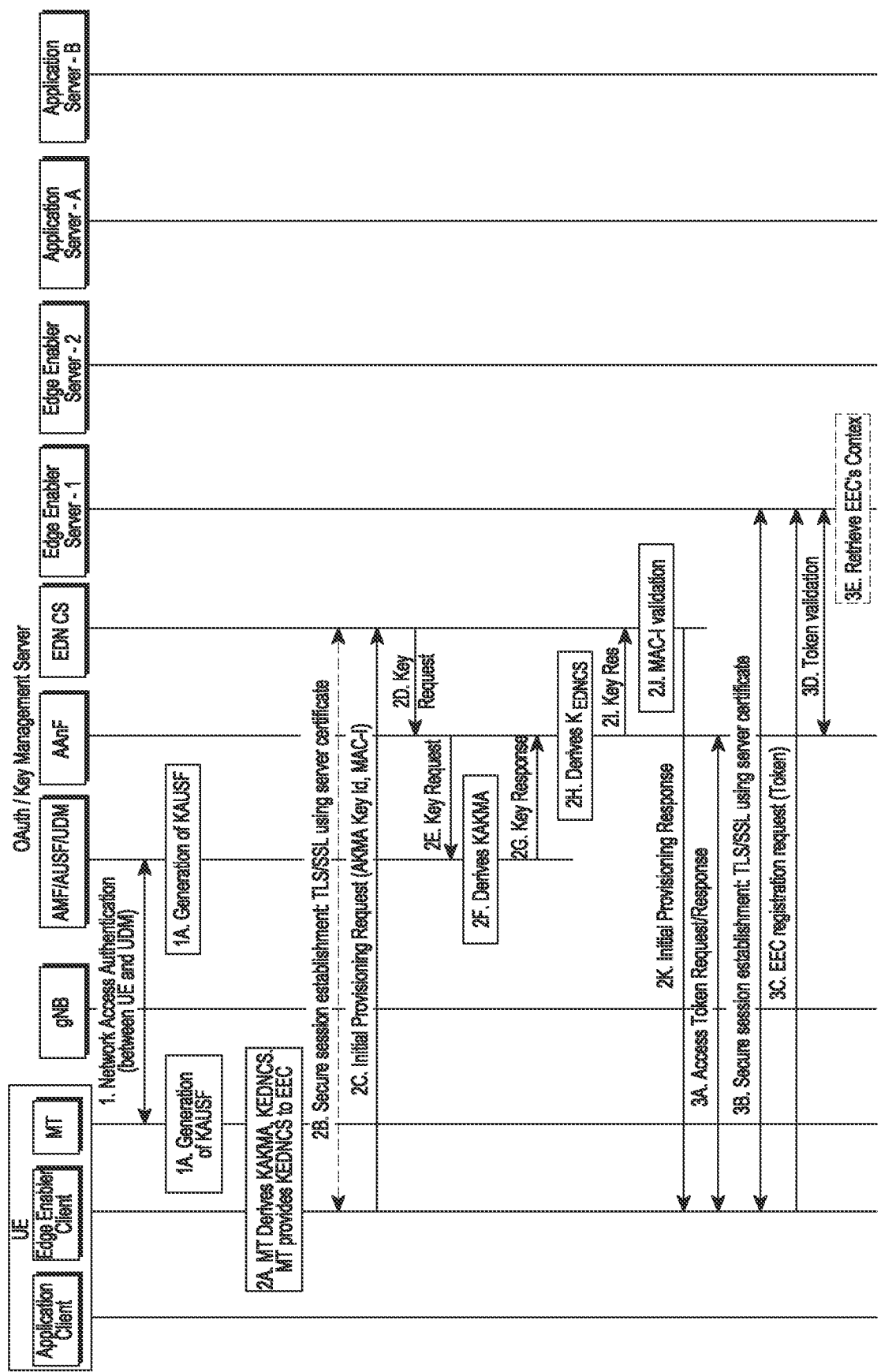
FIG. 2 is an example sequence diagram depicting the flow of information between different elements of the architecture, wherein the AAnF acts as an Open Authorization Server for rendering of MEC services, according to embodiments as disclosed herein.
Figure 2B:
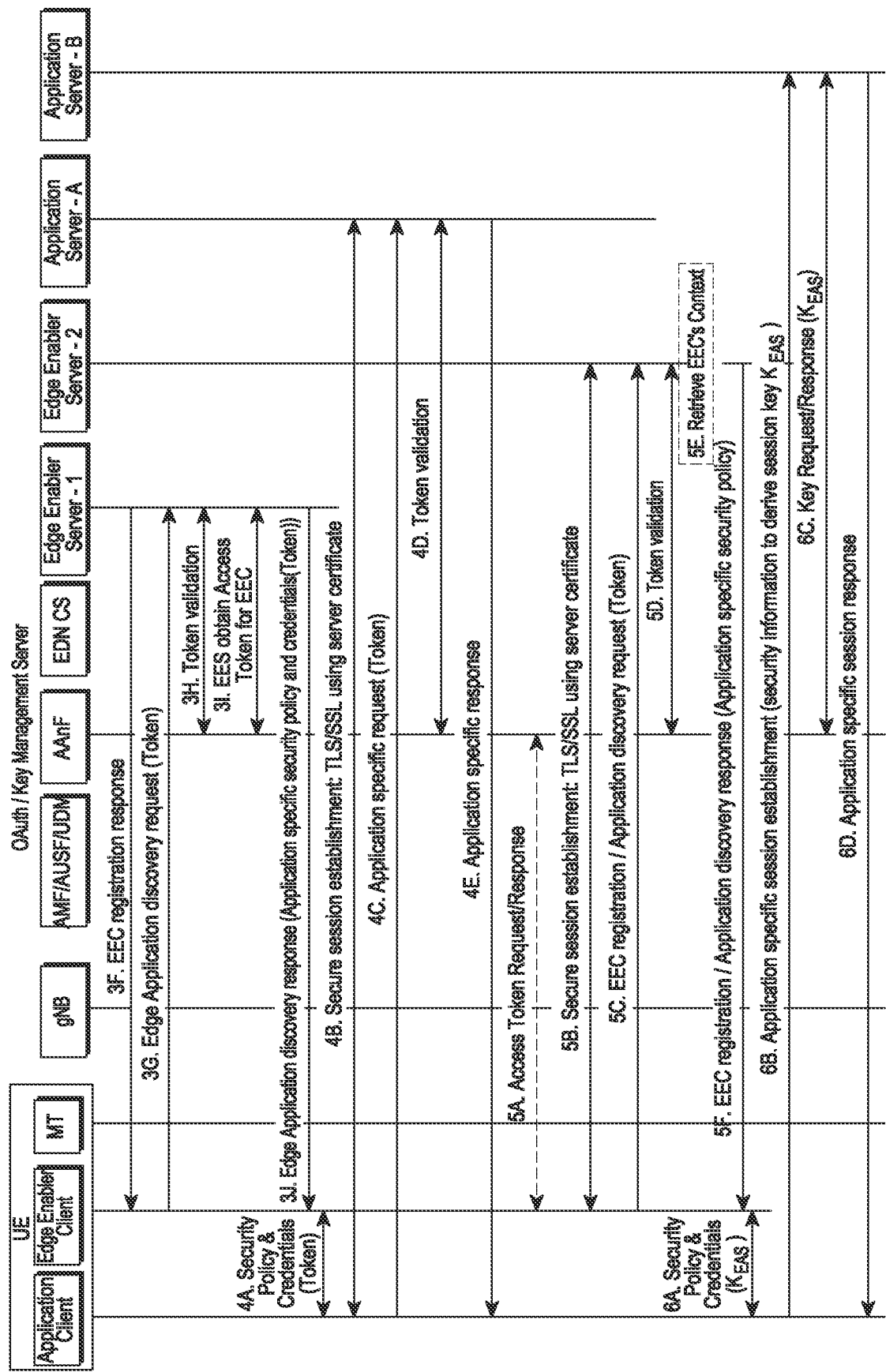

FIG. 2 is an example sequence diagram depicting the flow of information between different elements of the architecture, wherein the AAnF 106 acts as an Open Authorization Server for rendering of MEC services, according to embodiments as disclosed herein. In this example, the Edge Data Network Configuration Server (EDN CS) represents the ECS 110. There is a single application client (application) in the UE 101 that is availing MEC services from two Edge Application Servers (EAS), viz., EAS-A (112) and EAS-B (112). There are two Edge Enabler Servers (EES), EES-1 (111) and EES-2 (111). The EES-1 (111) and EAS-A (112) can be considered as part of a first EDN (109). The EES-2 (111) and EAS-B (112) can be considered as part of a second EDN (109).

Step 1: The UE 101 performs procedures as defined in 3GPP specifications to obtain access to 5G Core (SA) network.

Step 1A: After the completion of network access authentication procedure (Primary authentication and key agreement as defined in 3GPP specifications), the UE 101 and the AUSF 107 are in possession of a key $K_{AUSF}$.

Step 2A: The UE 101 can derive an AKMA key $K_{AMA}$ (as defined in 3GPP specifications) and an edge authentication key $K_{ECS}$ or $K_{EDNCS}$. In an embodiment, $K_{ECS}$ can be derived based on:

$$K_{ECS}=KDF\{K_{AKMA}, ECS \text{ Internet Protocol } (IP)\ \text{Address, AKMA Key } ID, \text{ other possible parameters}\}$$

Step 2B: The EEC 110 can establish a Secure Sockets Layer (SSL) or a Transport Layer Security (TLS) session with the ECS 110, for securing the communication between the UE 101 and the ECS 110.

Steps 2C-2K: The UE 101 initiates MEC Service provisioning procedure with the ECS 110 (as defined in 3GPP specifications). The UE 101 sends an initial provisioning request message to the ECS 110. In this scenario, the UE 101 acts as an AKMA client and the ECS 110 acts as an Application Function (AF) for the AAnF 106 (as defined in 3GPP specifications). Therefore, the UE 101 includes the AKMA Key ID and generates MAC-I over the initial provisioning request message using the key $K_{ECS}$ to prove its authenticity. The ECS 110 contacts the AAnF 106 (using AKMA ID) to obtain the key $K_{ECS}$ corresponding to the UE 101. The key $K_{ECS}$ is used by the ECS 110 to verify the MAC-I generated by the UE 101 (sent by the UE 101 along with the initial provisioning request message) and provide a provisioning response. Once the MAC-I is verified by the ECS 110, the ECS 110 provides an initial provisioning response for authenticating the UE 101.

Step 3: The UE 101 performs MEC service registration and discovery with EES-1 (111) (as defined in 3GPP specifications).

Step 3A: The UE 101 requests the AAnF 106 to issue EES token to enable the UE 101 to connect to EES-1 (111). If the UE 101 is authorized to access EES-1 (111), then the AAnF 106 generates an EES token and provides the EES token to the UE 101 in a secure way (the token is encrypted using the $K_{AKMA}$ key or a combination of derived keys).

Step 3B: The UE 101 and the EES-1 (111) establish a secure channel using an EES server certificate. The UE 101 needs to provide the EES token to an authentic EES.

Steps 3C-3F: The UE 101 can initiate a MEC service registration procedure with EES-1 (111) (as defined in 3GPP specifications). The UE 101 can send a MEC service registration request (EEC registration request) to EES-1 (111), which includes the EES token obtained from the AAnF 106 in Step 3A. The validation of the MEC service registration request, received from the EEC 103, is performed by verification of the EES token issued by the AAnF 106 to the UE 106. The EES-1 (111) utilizes token validation service of the AAnF 106 for validating the EES token included in the MEC service registration request.

In case, the EES token obtained from the AAnF 106 (in Step 3A) is not valid (if validity period of the EES token has elapsed), then the UE 101 requests the AAnF 106 to provide a new EES token (performs the step 3A again). The token request message includes the necessary parameters to identify security context of the EEC 103 and parameters for verifying the authenticity of the EEC 103. After the verification of the authenticity, the AAnF 106 provides a new EES token to the UE 101, as a response to the token request message.

Steps 3G-3J: Step 3F-3I: The UE 101 can initiate a MEC service discovery procedure with the EES-1 (111) (as defined in 3GPP specifications) by sending a MEC service discovery request (Edge application discovery request), which includes the EES token received from the AAnF 106. The EES-1(111) utilizes the token validation service of the AAnF 106 for validating the EES token. The EES-1 (111) requests the AAnF 106 for obtaining EAS access token(s) from the AAnF 106. The EAS access token(s) enable the UE 101 to access the EAS(s) (112) providing MEC services intended by the UE 101. The EES-1 (111) sends the EAS access token(s), EAS 112 (EAS-A (112)) specific security policy, and relevant information such as validity time (of the EAS access token), to the UE 101 in an MEC discovery response (Edge application discovery response).

Steps 4A-4E: The UE 101 obtains desired MEC service from the EAS-A (112), by sending the EAS access token, obtained from the EES-1 (111), to the EAS-A (112) over the secure channel (secured using TLS/SSL). The EAS access token is included in a MEC service request (Application specific request) and sent to EAS-A (111). The UE 101 also obtains security policy pertaining to EAS-A (112) and the EAS access token from EES-1 (111) in Step 3J. Before sending the EAS access token to the EAS-A (112), the UE 101 and the EAS-A (112) establish a secure channel using EAS server certificate. The channel is required by the UE 101 to provide the EAS access token to an authentic EAS 112. The EAS-A (112) obtains the EAS access token from the UE 101 and validates the EAS access token by availing the token validation service from the AAnF 106. Once the EAS access token is validated, the EAS-A (112) sends an application specific response for providing intended MEC services to the UE 101. Thereafter, the UE 106 obtains the intended MEC services from the EAS-A (112).

Step 5: The UE 101 performs MEC service registration and discovery (EEC registration/Application discovery) with the EES-2 (111).

Step 5A: The UE 101 may obtain a different EES token from the AAnF 106 if the EES token issued for EES-1 (111) is not valid or cannot be used for EES-2 (111).

Step 5B: The UE 101 and the EES-2 (111) establish a secure channel using EES-2 (111) server certificate prior to sending the EES token to the EES-2 (111).

Steps 5C-5F: The UE 101 sends a MEC service registration or MEC discovery (EEC registration/Application discovery) request, along with the EEC token, to the EES-2 (111). The EES-2 (111) utilizes the token validation service of the AAnF 106 for validating the EES token. Once the EES token is validated, the EES-2 (111) can send an EEC registration/Application discovery response to the UE 101. The UE 101 obtains relevant security policy, from the EES-2 (111), pertaining to EAS-B (112), to access EAS-B (112), in the EEC registration/Application discovery response. In order to avail MEC services from the EAS-B (112), the UE 101 can generate an EAS access key based on the security policy.

Step 6: Based on the received security policy, the EEC 103 in the UE 101 generates the $K_{EAS}$ using the $K_{EES}$ and provides the $K_{EAS}$ to the application client in the UE 101. The UE 101 obtains MEC services from the EAS-B (112) by getting authenticated by the EAS-B (112) using the EAS access key $K_{EAS}$. The UE 101 is aware of the security mechanism that needs to be applied to avail MEC services from EAS-B (112), based on the security policy obtained from the EES-2 (111) in Step 5F. The UE 101 sends a MEC service request to the EAS-B (112), which includes information to derive the EAS access key $K_{EAS}$. The UE 101 sends the information to receive MEC services from the EAS-B (112). The EAS-B (112) obtains the EAS access key $K_{EAS}$ from the AAnF 106. In an embodiment, $K_{EAS}$ can be derived based on:

$K_{EAS}$=KDF{$K_{AKMA}$, EAS IP Address, AKMA Key ID, other possible parameters}

Once the EAS access key $K_{EAS}$ is validated, the EAS-B (112) sends an application specific response for providing intended MEC services to the UE 101. Thereafter, the UE 101 obtains the intended MEC services from the EAS-B (112).

Figure 3:
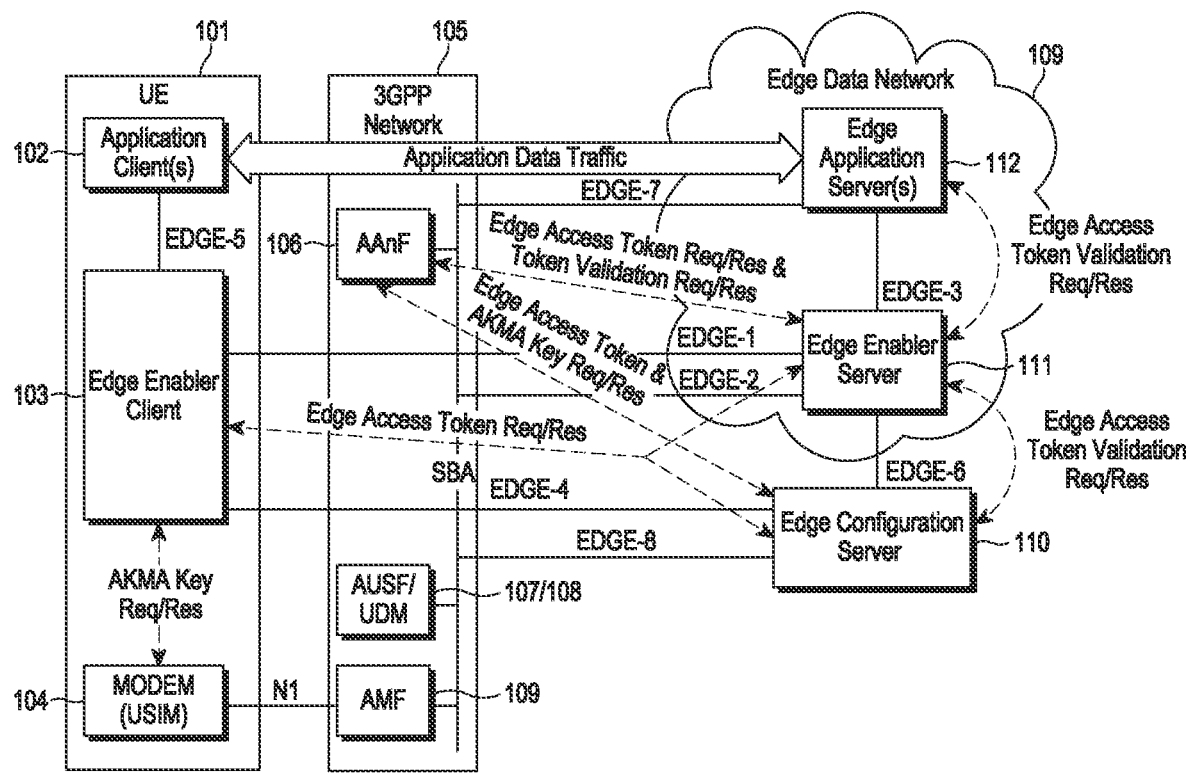
FIG. 3 depicts the example architecture for rendering MEC services to a UE through a 5G network with SA architecture, wherein the AAnF acts as the Open Authorization Server for rendering of the MEC services, wherein an ECS and an EES act as proxies for the UE and an EAS, to access the AAnF, according to embodiments as disclosed herein.

FIG. 3 depicts the example architecture for rendering MEC services to the UE 101 through a 5G network with SA architecture, wherein the AAnF 106 acts as the Open Authorization Server for rendering of the MEC services, wherein the ECS 110 and the EES 109 act as proxies for the UE 101 and the EAS 112, to access the AAnF 106, according to embodiments as disclosed herein. As depicted in FIG. 3, the architecture comprises the UE 101, the 3GPP network 105, the EDN 109, and the ECS 110. The UE 101 comprises at least one application client 102, the EEC 103, and the Modem 104. The at least one application client 102 can refer to at least one edge application installed in the UE 101. The 3GPP network 105 in the architecture is the 5G network with SA architecture. The 3GPP network 105 comprises the AAnF 106, the AUSF 107, the UDM 108, and the AMF 109. The EDN 109 comprises the EES 111 and the at least one EAS 112. The EAS 112 provides MEC services to the UE 101.

2$^{nd}$ embodiment: This embodiment is represented in the architecture depicted in FIG. 3. In this embodiment, the ECS 110 and the EES 109 act as proxies for the UE 101 and the EAS 112, to access the AAnF 106. There is no direct access to the AAnF 106 from the UE 101 and the EAS 112. The AAnF 110 acts as the Edge Open Authorization Server. The "highlighted dotted lines" in FIG. 3 indicate the services offered/obtained between the entities.

The AAnF 106 issues EES tokens and provides the EES tokens to the ECS 110. The EES tokens are provided to the UE 101, wherein the UE 101 provides the EES tokens to the EES 111. The EES 111 verifies the EES tokens to authorize the UE 101 for allowing the UE 101 to register with the EES 111 and allow the UE 101 to discover an EAS 112 that is providing the MEC services intended by the UE 101. The EAS 112 verifies the EAS access tokens, received from the UE 101, with the AAnF 106. The AAnF 106 provides EAS access credentials, pertaining to the EAS 112 providing the intended MEC services, to the EES 111. These access credentials allow the UE 101 to access the EAS 112 for availing MEC services. The EAS 112 verifies the EAS access credentials, received from the UE 101, with the AAnF 106, for rendering the MEC services to the UE 101.

Figure 4A:
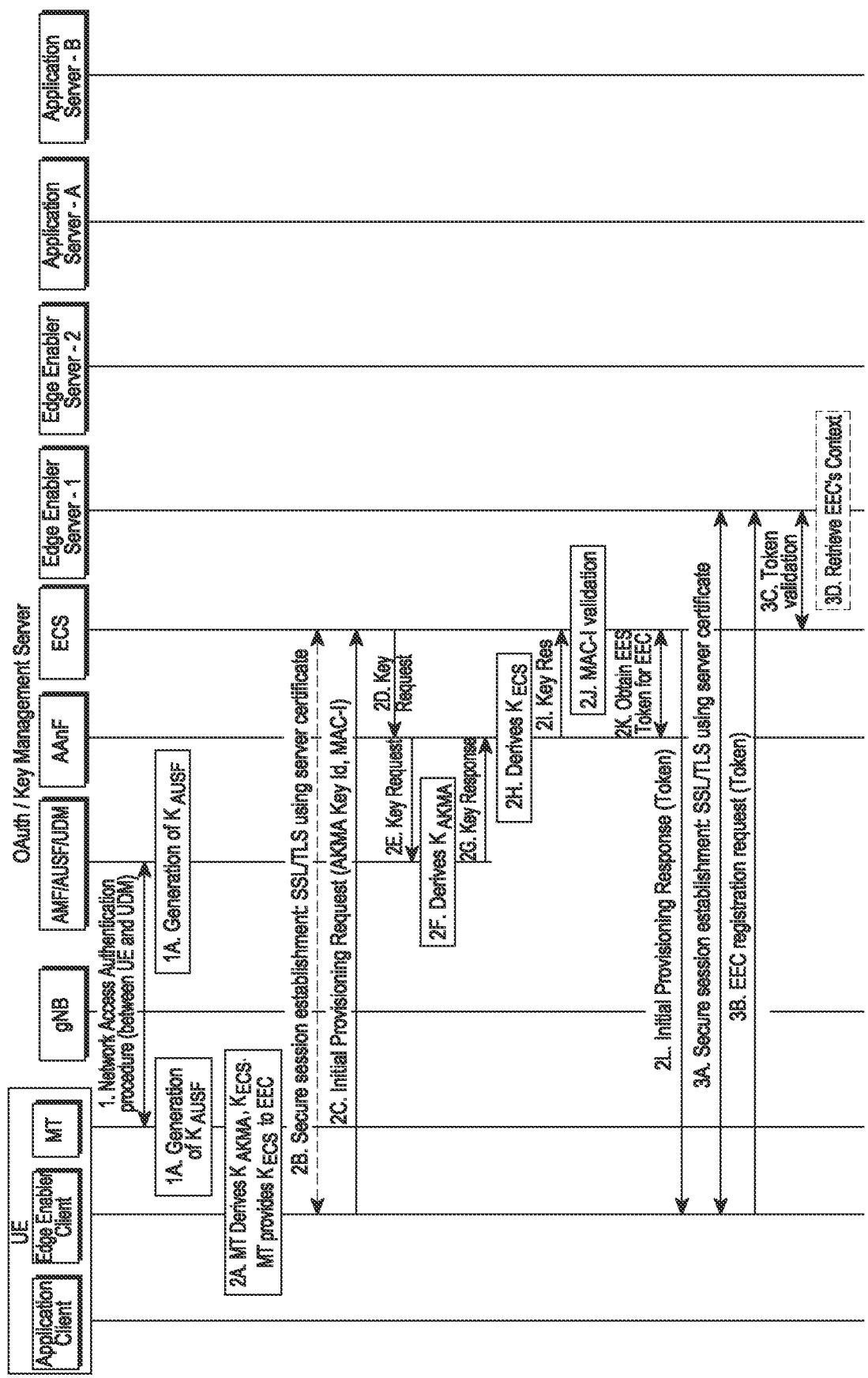
FIG. 4 is an example sequence diagram depicting the flow of information between different elements of the architecture, wherein the AAnF acts as the Open Authorization Server for rendering of the MEC services, wherein the ECS and the EES act as proxies for the UE and the EAS, to access the AAnF, according to embodiments as disclosed herein.
Figure 4B:
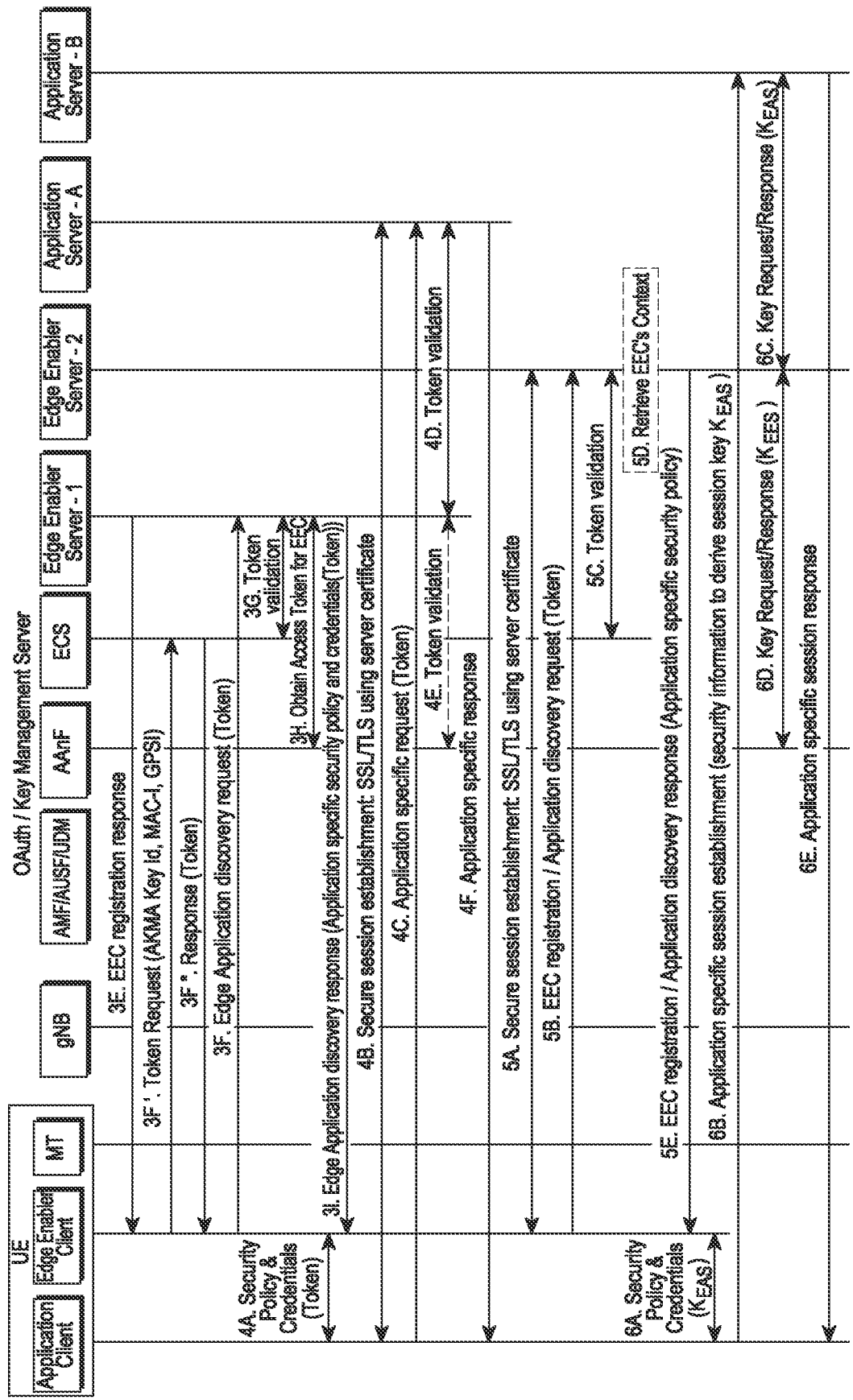

FIG. 4 is an example sequence diagram depicting the flow of information between different elements of the architecture, wherein the AAnF 106 acts as the Open Authorization Server for rendering of the MEC services, wherein the ECS 110 and the EES 109 act as proxies for the UE 101 and the EAS 112, to access the AAnF 106, according to embodiments as disclosed herein. In this example, the EDN CS represents the ECS 110. There is a single application client (application) in the UE 101 that is availing MEC services from EAS-A (112) and EAS-B (112). The EES-1 (111) and EAS-A (112) can be considered as part of a first EDN (109). The EES-2 (111) and FAS-B (112) can be considered as part of a second EDN (109).

Step 1: The UE 101 performs procedures as defined in 3GPP specifications to obtain access to a 5G Core (SA) network.

Step 1A: After the completion of network access authentication procedure (Primary authentication and key agreement as defined in 3GPP specifications), the UE 101 and the AUSF 107 are in possession of a key $K_{AUSF}$.

Step 2A: The UE 101 can derive an AKMA key $K_{AKMA}$ (as defined in 3GPP specifications) and an edge authentication key $K_{ECS}$ or $K_{EDNCS}$. In an embodiment, $K_{ECS}$ can be derived based on:

$K_{ECS}$=KDF{$K_{AKMA}$, ECS Internet Protocol (IP) Address, AKMA Key ID, other possible parameters}

Step 2B: The EEC 110 can establish a Secure Sockets Layer (SSL) or a Transport Layer Security (TLS) session with the ECS 110, for securing the communication between the UE 101 and the ECS 110.

Steps 2C-2J: The UE 101 initiates MEC Service provisioning procedure with the ECS 110 (as defined in 3GPP specifications). The UE 101 sends an initial provisioning request message to the ECS 110. In this scenario, the UE 101 acts as an AKMA client and the ECS 110 acts as an AF for the AAnF 106 (as defined in 3GPP specifications). Therefore, the UE 101 includes the AKMA Key ID and generates MAC-I over the initial provisioning request message using the key $K_{ECS}$ to prove its authenticity. The ECS 110 contacts the AAnF 106 (using AKMA ID) to obtain the key $K_{ECS}$ (edge authentication key) corresponding to the UE 101. The key $K_{ECS}$ is used by the ECS 110 to verify the MAC-I generated by the UE 101 (sent by the UE 101 along with the initial provisioning request message) and provide a provisioning response. Once the MAC-I is verified by the ECS 110, the ECS 110 provides an initial provisioning response for authenticating the UE 101.

At Step 2K, the ECS 110 can request the AAnF 106 to generate EES token (for EEC 103). The AAnF 106 generates the EES token and sends the EES token to the ECS 110. The ECS 110 stores the EES token and provides the EES token, obtained from the AAnF 106, to the UE 101. At Step 2L, the ECS 110 sends the EES token to the UE 101 in a secure way (the token is encrypted using $K_{AKMA}$ key or other derived keys or secured by the established TLS/SSL).

Step 3A: Prior to the UE 101 sending the EES token to the EES-1 (111), the UE 101 and the EES-1 (111) can establish a secure channel using EES-1 (111) server certificate. The secure channel ensures that the EES token is transported securely.

Steps 3B-3E: The UE 101 initiates MEC service registration procedure with the EES-1 (111) (as defined in 3GPP specifications). The UE 101 can send a MEC service registration request (EEC registration request) to EES-1 (111), which includes the EES token obtained from the ECS 110 in Step 2L. The validation of the MEC service registration request, received from the EEC 103, is performed by verification of the EES token issued by the ECS 110 to the UE

101. The EES-1 (111) utilizes token validation service of the ECS 110 for validating the EES token included in the MEC service registration request.

Steps 3F'-3F''': In case, the EES token obtained from the ECS 110 (at Step 2L) is not valid (if validity period of the EES token has elapsed), then the UE 101 requests the ECS 110 to provide a new EES token. The token request message includes the necessary parameters to identify security context of the EEC 103 and parameters for verifying the authenticity of the EEC 103. After the verification of the authenticity, the ECS 110 provides a new EES token to the UE 101, as a response to the request. The ECS 110 may interact with the AAnF 106 to issue the new EES token.

Steps 3F-3I: The UE 101 can initiate a MEC service discovery procedure with the EES-1 (111) (as defined in 3GPP specifications) by sending a MEC service discovery request (Edge application discovery request), which includes the EES token. The EES-1 (111) utilizes the token validation service of the ECS 110 for validating the EES token. The EES-1 (111) requests the AAnF 106 for obtaining EAS access token(s) from the AAnF 106. The EAS access token(s) enable the UE 101 to access to the EAS(s) (112) providing MEC services intended by the UE 101. The EES-1 (111) sends the EAS access token(s), EAS 112 (EAS-A (112)) specific security policy, and relevant information such as validity time (of the EAS access token), to the UE 101 as a MEC discovery response (Edge application discovery response) to the MEC service discovery request.

Steps 4A-4F: The UE 101 obtains the desired MEC service from the EAS-A (112), by sending the EAS access token, obtained from the EES-1 (111), to the EAS-A (112) over the secure channel (secured using TLS/SSL). The EAS access token is included in a MEC service request (Application specific request) and sent to EAS-A (111). The UE 101 also obtains security policy pertaining to EAS-A (112) along with the EAS access token from the EES-1 (111) in Step 3I. Before sending the EAS access token to the EAS-A (112), the UE 101 and the EAS-A (112) establish a secure channel using EAS-A (112) server certificate. The channel is required by the UE 101 to provide the EAS access token to an authentic EAS 112.

The EAS-A (112) obtains the EAS access token from the UE 101 and validates the EAS access token. The EAS-A (112) obtains the token validation service from the EES-1 (111). The EES-1 (111) may contact the AAnF 106 to obtain the token validation service from the AAnF 106. The AAnF 106 validates the EAS access token and provides the result of validation to the EES-1 (111). The EES-1 (111) provides the result of validation to EAS-A (112). Once the EAS access token is validated, the EAS-A (112) sends an application specific response for providing intended MEC services to the UE 101. Thereafter, the UE 101 obtains the intended MEC services from the EAS-A (112).

Step 5: The UE 101 performs MEC service registration and discovery (EEC registration/Application discovery) with the EES-2 (111). The UE 101 may obtain a different EES token, if the EES token issued for EES-1 (111) is not valid or cannot be used for EES-2 (111).

Step 5A: Before sending the EES token to EES-2 (111), the UE 101 and the EES-2 (111) establish a secure channel using EES-2 (111) server certificate.

Steps 5B-5E: The UE 101 sends a MEC service registration or MEC discovery (EEC registration/Application discovery) request, along with the EEC token, to the EES-2 (111). The EES-2 (111) utilizes the token validation service of the ECS 110 for validating the EES token. Once the EES token is validated, the EES-2 (111) can send an EEC registration/Application discovery response to the UE 101. The UE 101 obtains relevant security policy, from the EES-2 (111), pertaining to EAS-B (112) in the EEC registration/Application discovery response. In order to avail MEC services from the EAS-B (112), the UE 101 can generate an EAS access key based on the security policy.

Step 6: Based on the received security policy, the EEC 103 in the UE 101 generates the $K_{EAS}$ using the $K_{EES}$ and provides the $K_{EAS}$ to the application client in the UE 101. The UE 101 obtains MEC services from the EAS-B (112) by getting authenticated by the EAS-B (112) using the EAS access key $K_{EAS}$. The UE 101 is aware of the security mechanism that needs to be followed in order to avail MEC services from the EAS-B (112) (as the UE 101 has received the security policy from the EES-2 (111) in Step 5E). The UE 101 sends a MEC service request to the EAS-B (112), which includes information to derive the EAS access key $K_{EAS}$. The UE 101 sends the information to receive MEC services from the EAS-B (112). The EAS-B (112) obtains the EAS access key $K_{EAS}$ from the EES-2 (111) as part of the procedure of the verification of the MEC service request received from the UE 101. The EES-2 (112) obtains a key $K_{EES}$ from the AAnF 106 to derive the key $K_{EAS}$. The derivation of $K_{EES}$ is based on:

$$K_{EES} = KDF\{K_{AKMA}, EES\ IP\ Address, AKMA\ Key\ ID, other\ possible\ parameters\}$$

The derivation of $K_{EAS}$ is based on:

$$K_{EAS} = KDF\{K_{EES}, EAS\ IP\ Address, AKMA\ Key\ ID, other\ possible\ parameters\}$$

The UE 101 obtains the intended MEC service from the EAS-B (112) after the verification of the EAS access key $K_{EAS}$ received from the UE 101. The FAS-B (112) sends an application specific response for providing intended MEC services to the UE 101.

Figure 5:
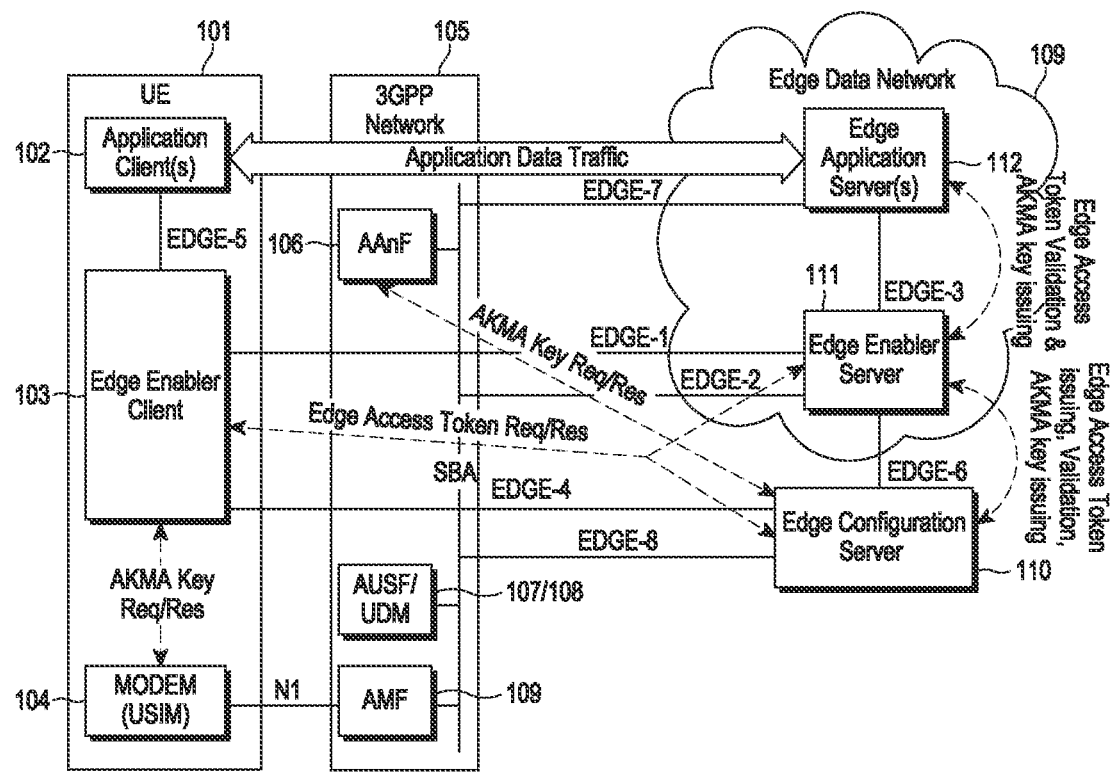
FIG. 5 depicts the example architecture for rendering MEC services to the UE through a 5G network with SA architecture, wherein the ECS acts as the Open Authorization Server for the rendering of MEC services to the UE, according to embodiments as disclosed herein.

FIG. 5 depicts the example architecture for rendering MEC services to the UE 101 through a 5G network with SA architecture, wherein the ECS 110 acts as the Open Authorization Server for the rendering of MEC services to the UE 101, according to embodiments as disclosed herein. As depicted in FIG. 5, the architecture comprises the UE 101, the 3GPP network 105, the EDN 109, and the ECS 110. The UE 101 comprises at least one application client 102, the EEC 103, and the Modem 104. The at least one application client 102 can refer to at least one edge application installed in the UE 101. The 3GPP network 105 in the architecture is the 5G network with SA architecture. The 3GPP network 105 comprises the AAnF 106, the AUSF 107, the UDM 108, and the AMF 109. The EDN 109 comprises the EES 111 and the at least one EAS 112. The EAS 112 provides MEC services to the UE 101.

$3^{rd}$ embodiment: This embodiment is represented in the architecture depicted in FIG. 5. In this embodiment, the ECS 110 acts as the Open Authorization Server for rendering of the MEC services. The ECS 110 issues and validates EES tokens to the UE 101. The "highlighted dotted lines" in FIG. 5 indicates the security service offered/obtained by the entities. It can be assumed that the MNOs have the ECS 110 in confidence.

The ECS 106 issues EES tokens and provides the EES tokens to the UE 101. The UE 101 provides the EES tokens to the EES 111 for getting authorized by the EES 111. The EES 111 verifies the EES tokens to authorize the UE 101 for allowing the UE 101 to register with the EES 111 and allow the UE 101 to discover an EAS 112 that is providing the MEC services intended by the UE 101. The EES 111 verifies the EES tokens with the aid of the ECS 110. The EAS 112 verifies the EAS access tokens, received from the UE 101, with the aid of the ECS 110. The ECS 110 provides EAS access credentials, pertaining to the EAS 112 providing the intended MEC services, to the EES 111. These access credentials allow the UE 101 to access the EAS 112 for availing MEC services. The EAS 112 verifies the EAS access credentials, received from the UE 101, with the aid of the ECS 110, for rendering the MEC services to the UE 101.

Figure 6A:
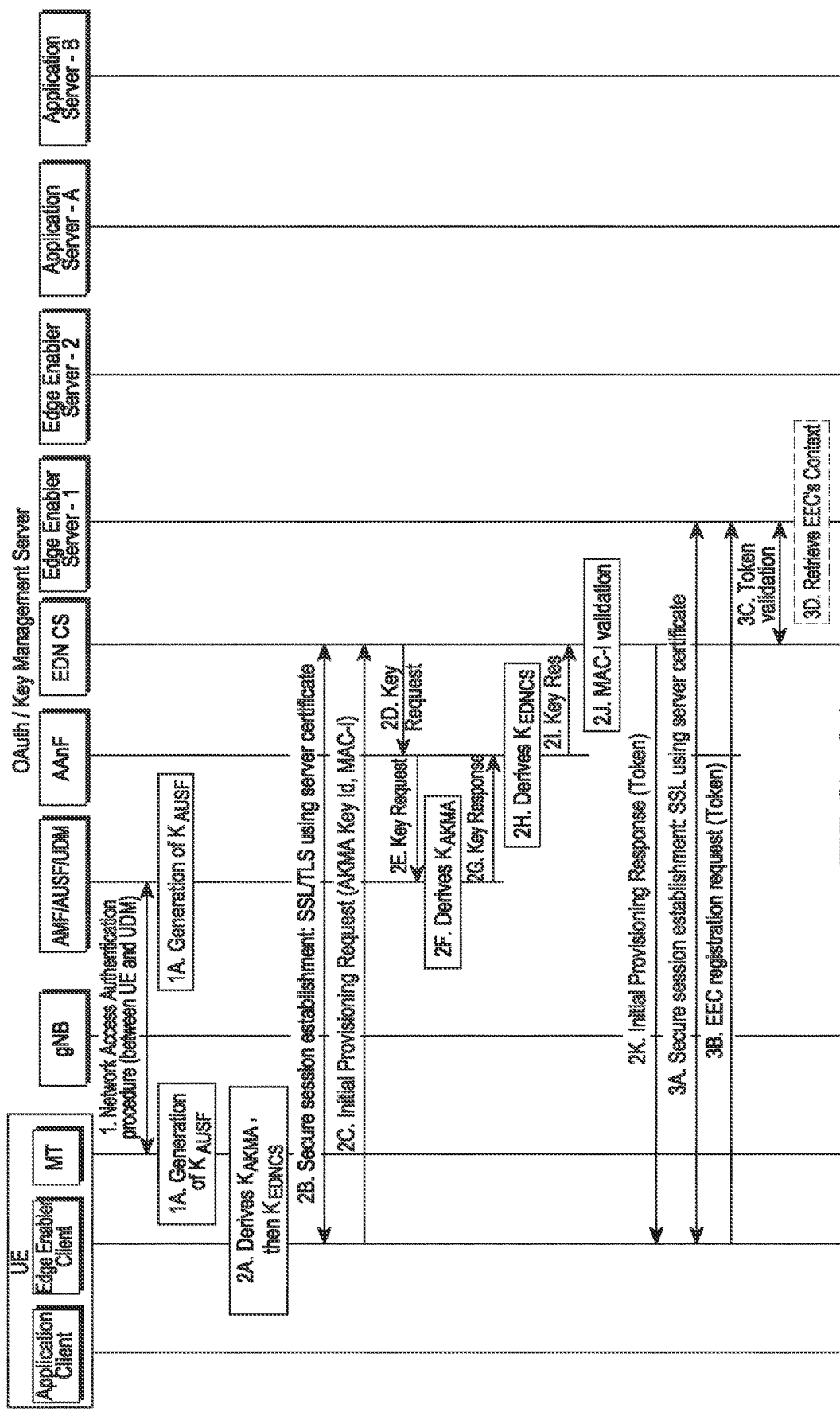
FIG. 6 is an example sequence diagram depicting the flow of information between different elements of the architecture, wherein the ECS acts as the Open Authorization Server for rendering of the MEC services to the UE, according to embodiments as disclosed herein.
Figure 6B:
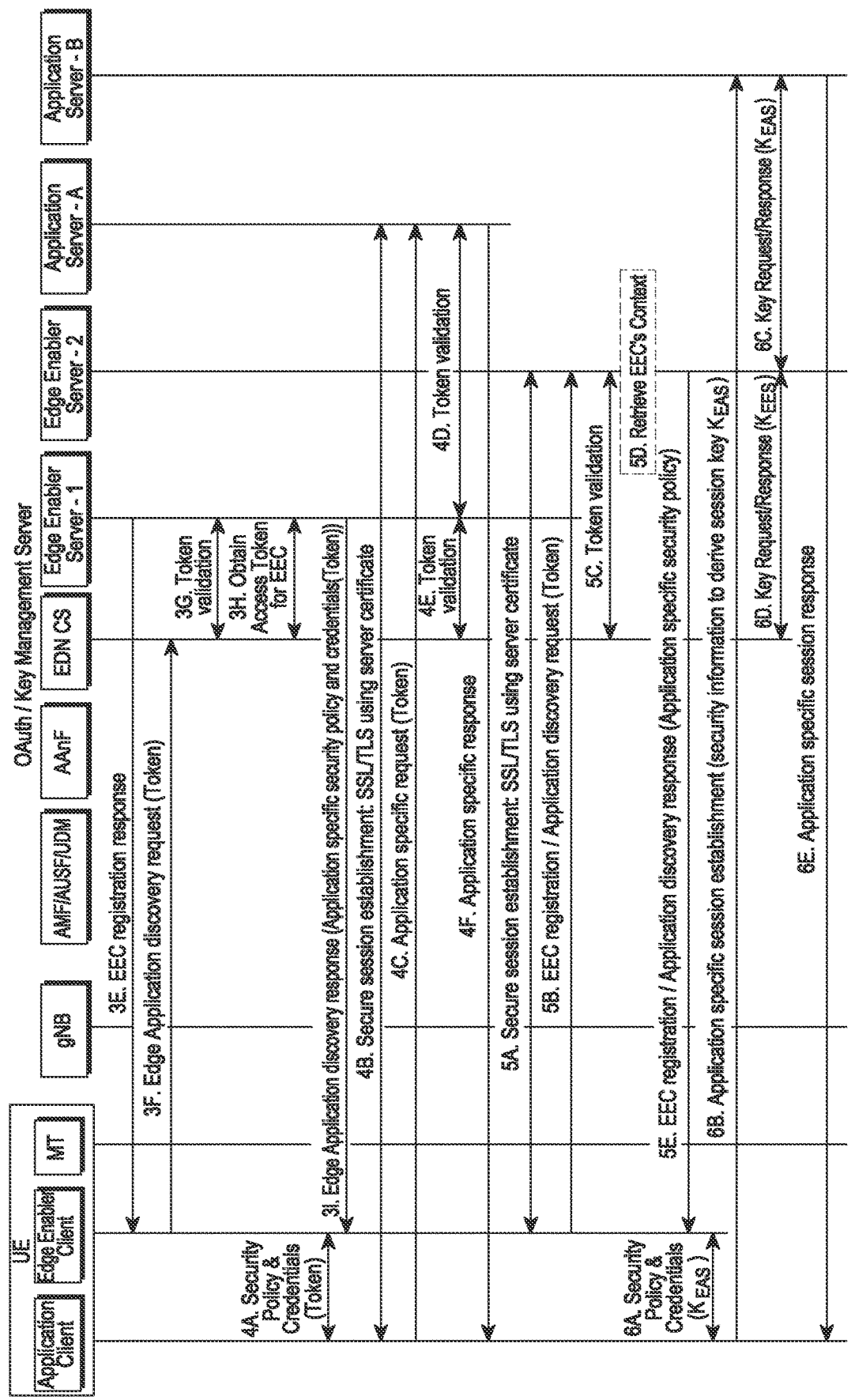

FIG. 6 is an example sequence diagram depicting the flow of information between different elements of the architecture, wherein the ECS 110 acts as the Open Authorization Server for rendering of the MEC services to the UE 101, according to embodiments as disclosed herein. In this example, the EDN CS represents the ECS 110. There is a single application client (application) in the UE 101 that is availing MEC services from EAS-A (112) and EAS-B (112). The EES-1 (111) and EAS-A (112) can be considered as part of a first EDN (109). The EES-2 (111) and EAS-B (112) can be considered as part of a second EDN (109). In an alternate embodiment, there can be more than one application clients (applications) in the UE 101 that are availing MEC services from one or more EAS(s) (112), which are part of one or more EDNs (109).

Step 1: The UE 101 performs procedures as defined in 3GPP specifications to obtain access to a 5G Core (SA) network.

Step 1A: After the completion of network access authentication procedure (Primary authentication and key agreement as defined in 3GPP specifications), the UE 101 and the AUSF 107 are in possession of a key $K_{AUSF}$.

Step 2A: The UE 101 can derive an AKMA key $K_{AMA}$ (as defined in 3GPP specifications) and an edge authentication key $K_{ECS}$ or $K_{EDNCS}$. In an embodiment, $K_{ECS}$ can be derived based on:

$K_{ECS}$=KDF{$K_{AKMA}$, ECS Identity or Internet Protocol (IP) Address, other possible parameters}

Step 2B: The EEC 110 can establish a Secure Sockets Layer (SSL) or a Transport Layer Security (TLS) session with the ECS 110, for securing the communication between the UE 101 and the ECS 110.

Steps 2C-2K: The UE 101 initiates MEC initial service provisioning procedure with the ECS 110 (as defined in 3GPP specifications). The UE 101 sends an initial provisioning request message to the ECS 110. In this scenario, the UE 101 acts as an AKMA client and the ECS 110 acts as an AF for the AAnF (as defined in 3GPP specifications). Therefore, the UE 101 includes the AKMA Key ID and generates MAC-I over the initial provisioning request message using the key $K_{ECS}$ (or using the key generated further using the $K_{ECS}$) to prove its authenticity. The ECS 110 contacts the AAnF 106 (using AKMA ID) to obtain the key $K_{ECS}$ (edge authentication key) corresponding to the UE 101. The key $K_{ECS}$ is used by the ECS 110 to verify the MAC-I generated by the UE 101 (sent by the UE 101 along with the initial provisioning request message) and provide a provisioning response. Once the MAC-I is verified by the ECS 110, the ECS 110 provides an initial provisioning response for authenticating the UE 101.

If the UE 101 is authorized to access the EES-1 (111), then the ECS 110 generates EES token and provides the EES token to the UE 101 in a secure way (the token is encrypted using the $K_{ECS}$ key or other derived keys or using the established SSL/TLS session).

In an embodiment, the UE 101 can additionally include an Authentication Token (AUSF Token) to prove its authenticity (possession of the valid key $K_{AUSF}$). On receiving the AUSF Token the ECS 110 can provide the AUSF Token to the AAnF 106 in the key request message (Step 2D). The AAnF 106 verifies the AUSF Token after receiving key $K_{AKMA}$ in step 2G. If the verification of the AUSF Token is successful, the AAnF 106 proceeds with steps (3A to 6D). If the verification of the AUSF Token is unsuccessful, the AAnF 106 provides, to the ECS 110, an appropriate error cause in a reject message to the UE 101.

Step 3: The UE 101 performs MEC service registration and discovery with the EES-1 (111) (as defined in 3GPP specifications).

Step 3A: Prior to the UE 101 sending the EES token to the EES-1 (111), the UE 101 and the EES-1 (111) can establish a secure channel using EES-1 (111) server certificate. The secure channel ensures that the EES token is transported securely.

Steps 3B-3E: The UE 101 initiates MEC service registration procedure with the EES-1 (111) (as defined in 3GPP specifications). The UE 101 can send a MEC service registration request (EEC registration request) to EES-1 (111), which includes the EES token obtained from the ECS in Step 2K. The validation of the MEC service registration request, received from the EEC 103, is performed by verification of the EES token issued by the ECS 110 to the UE 101. The EES-1 (111) utilizes token validation service of the ECS 110 for validating the EES token included in the MEC service registration request. If the EES-1 (111) is already in possession of the required security credentials to validate the token, then the EES-1 (111) can validate the EES token included in the MEC service registration request.

In case, the EES token obtained from the ECS 110 (at Step 2K) is not valid (if validity period of the EES token has elapsed), then the UE 101 requests the ECS 110 to provide a new EES token. The token request message includes the necessary parameters to identify the security context of the EEC 103 and parameters for verifying the authenticity of the EEC 103. After verification of the authenticity, the ECS 110 provides a new EES token to the UE 101, as a response to the request.

Steps 3F-3I: The UE 101 can initiate a MEC service discovery procedure with the EES-1 (111) (as defined in 3GPP specifications) by sending a MEC service discovery request (Edge application discovery request), which includes the EES token. The EES-1 (111) may utilize the token validation service of the ECS 110 for validating the EES token. The EES-1 (111) requests the ECS 110 for obtaining EAS access token(s) from the ECS 110. The EAS access token(s) enable the UE 101 to access to the EAS(s) (112) providing MEC services intended by the UE 101. The EES-1 (111) sends the EAS access token(s), EAS 112 (EAS-A (112)) specific security policy, and relevant information such as validity time (of the EAS access token), to the UE 101 in a MEC discovery response (Edge application discovery response) to the MEC service discovery request.

Steps 4A-4F: The UE 101 obtains MEC service from the EAS-A (112), by sending the EAS access token, obtained from the EES-1 (111), to the EAS-A (112) over the secure channel (secured using TLS/SSL). The EAS access token is included in a MEC service request (Application specific request) and sent to EAS-A (111). The UE 101 also obtains security policy pertaining to EAS-A (112) along with the EAS access token from the EES-1 (111) in Step 3I. Before sending the EAS access token to the EAS-A (112), the UE 101 and the EAS-A (112) establish a secure channel using EAS-A (112) server certificate. The channel is required by the UE 101 to provide the EAS access token to an authentic EAS 112.

The EAS-A (112) obtains the EAS access token from the UE 101 and validates the EAS access token. The EAS-A (112) obtains the token validation service through the EES-1 (111). The EES-1 (111) may contact the ECS 110 to obtain the token validation service from the ECS 110. The ECS 110 validates the EAS access token and provides the result of validation to the EES-1(111). The EES-1(111) provides the result of validation to EAS-A (112). Once the EAS access token is validated, the EAS-A (112) sends an application specific response for providing intended MEC services to the UE 101. Thereafter, the UE 101 obtains the intended MEC services from the EAS-A (112). In an embodiment, if one of the EES-1 (111) and EAS-A (112) is already in possession of the required security credentials to validate the token, then the EES-1 (111) or EAS-A (112) can validate the EES token included in the MEC service registration request.

Step 5: The UE 101 performs MEC service registration and discovery (EEC registration/Application discovery) with the EES-2 (111). The UE 101 may obtain a different EES token, if the EES token issued for EES-1 (111) is not valid or cannot be used for EES-2 (111).

Step 5A: The UE 101 may obtain a different EES token to obtain authorization from the EES-2 (111), if the EES token issued by EES-1 (111) is not valid or cannot be used for obtaining authorization from the EES-2 (111). Before sending the EES token to the UE 101, the UE 101 and the EES-2 (111) establish a secure channel using EES-2 (111) server certificate.

Steps 5B-5E: The UE 101 sends a MEC service registration or MEC discovery (EEC registration/Application discovery) request, along with the EEC token, to the EES-2 (111). The EES-2 (111) utilizes the token validation service of the ECS 110 for validating the EES token. Once the EES token is validated, the EES-2 (111) can send an EEC registration/Application discovery response to the UE 101. The UE 101 obtains relevant security policy, from the EES-2 (111), pertaining to EAS-B (112) in the EEC registration/ Application discovery response. In order to avail MEC services from the EAS-B (112), the UE 101 can generate an EAS access key.

Step 6: Based on the received security policy, the EEC 103 in the UE 101 generates the $K_{EAS}$ using the $K_{EES}$ and provides the $K_{EAS}$ to the application client in the UE 101. The UE 101 obtains MEC service from the EAS-B (112) by getting authenticated by the EAS-B (112) using the EAS access key $K_{EAS}$. The UE 101 is aware of the security mechanism that needs to be followed in order to avail MEC services from the EAS-B (112), (as the UE 101 has received the security policy from the EES-2 (111) in Step 5E). The UE 101 sends a MEC service request to the EAS-B (112), which includes information to derive the EAS access key $K_{EAS}$. The UE 101 sends the information to receive MEC services from the EAS-B (112). The EAS-B (112) obtains the EAS access key $K_{EAS}$ from the EES-2 (111) as part of the procedure of the verification of the MEC service request received from the UE 101. The EES-2 (112) obtains a key $K_{EES}$ from the ECS 110 to derive the key $K_{EAS}$. The derivation of $K_{EES}$ is based on:

*109$K_{EES}$=KDF{$K_{ECS}$, EES IP Address, AKMA Key ID, other possible parameters}

The derivation of $K_{EAS}$ is based on:

$K_{EAS}$=KDF{$K_{EES}$, EAS IP Address, AKMA Key ID, other possible parameters}

The UE 101 obtains the intended MEC service from the EAS-B (112) after the verification of the EAS access key $K_{EAS}$ received from the UE 101. The FAS-B (112) sends an application specific response for providing intended MEC services to the UE 101.

Figure 7:
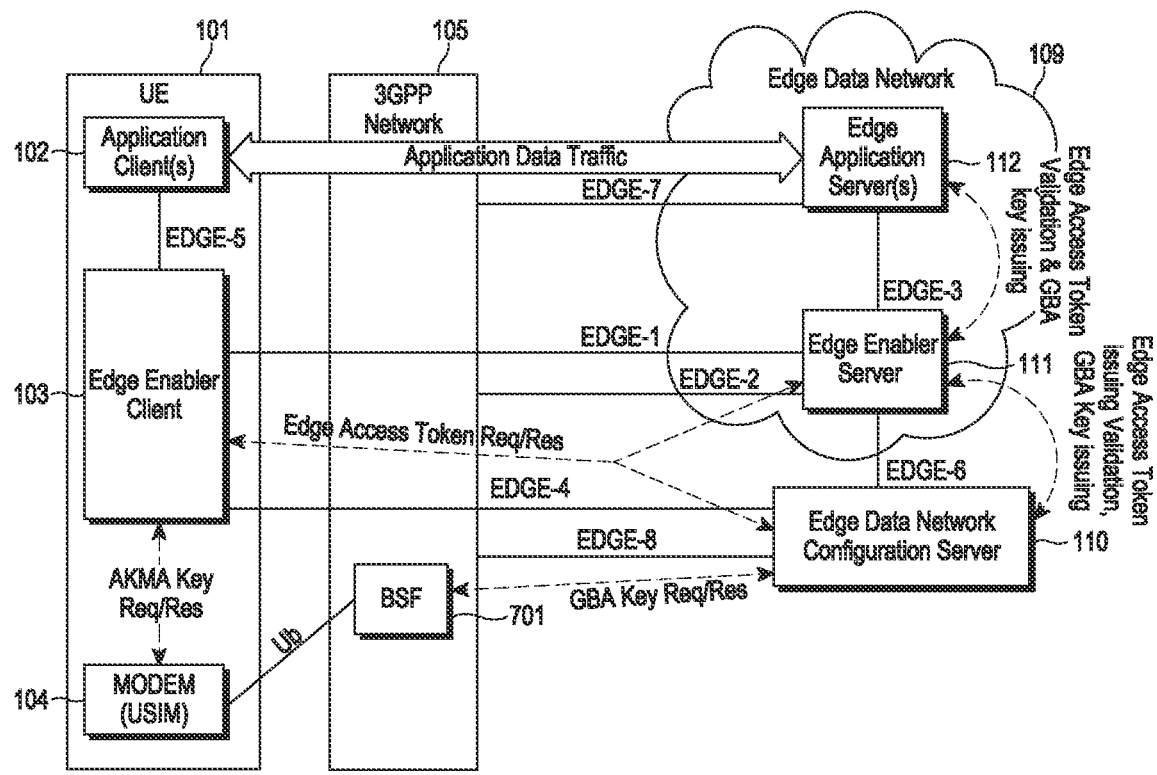
FIG. 7 depicts an example architecture for rendering MEC services to the UE through a 5G network with NSA architecture, wherein the ECS acts as the Open Authorization Server for rendering of MEC services, according to embodiments as disclosed herein.

FIG. 7 depicts an example architecture for rendering MEC services to the UE 101 through a 5G network with NSA architecture, wherein the ECS 110 acts as the Open Authorization Server for rendering of MEC services, according to embodiments as disclosed herein. As depicted in FIG. 7, the architecture comprises the UE 101, the 3GPP network 105, the EDN 109, and the ECS 110. The UE 101 comprises at least one application client 102, the EEC 103, and the Modem 104. The at least one application client 102 can refer to at least one edge application installed in the UE 101. The 3GPP network 105 in the architecture is the 5G network with NSA architecture. The 3GPP network 105 includes a Bootstrapping Server Function (BSF) 701. The EDN 109 comprises the EES 111 and the at least one EAS 112. The EAS 112 provides MEC services to the UE 101.

$4^{th}$ embodiment: This embodiment is represented in the architecture depicted in FIG. 7. In this embodiment, the BSF 701 (in 5G NSA architecture) provides the functionalities of the AAnF 106 (in 5G SA architecture). The entities in this architecture obtain the relevant keys using Generic Bootstrapping Architecture (GBA) architecture.

The ECS 110 issues EES tokens and provides the EES tokens to the UE 101. The UE 101 provides the EES tokens to the EES 111 for getting authorized by the EES 111. The EES 111 verifies the EES tokens to authorize the UE 101 for allowing the UE 101 to register with the EES 111 and allow the UE 101 to discover an EAS 112 that is providing the MEC services intended by the UE 101. The EES 111 verifies the EES tokens with the aid of the ECS 110. The EAS 112 verifies the EAS access tokens, received from the UE 101, with the aid of the ECS 110. The ECS 110 provides EAS access credentials, pertaining to the EAS 112 providing the intended MEC services, to the EES 111. These access credentials allow the UE 101 to access the EAS 112 for availing MEC services. The EAS 112 verifies the EAS access credentials, received from the UE 101, with the aid of the ECS 110, for rendering the MEC services to the UE 101.

Figure 8A:
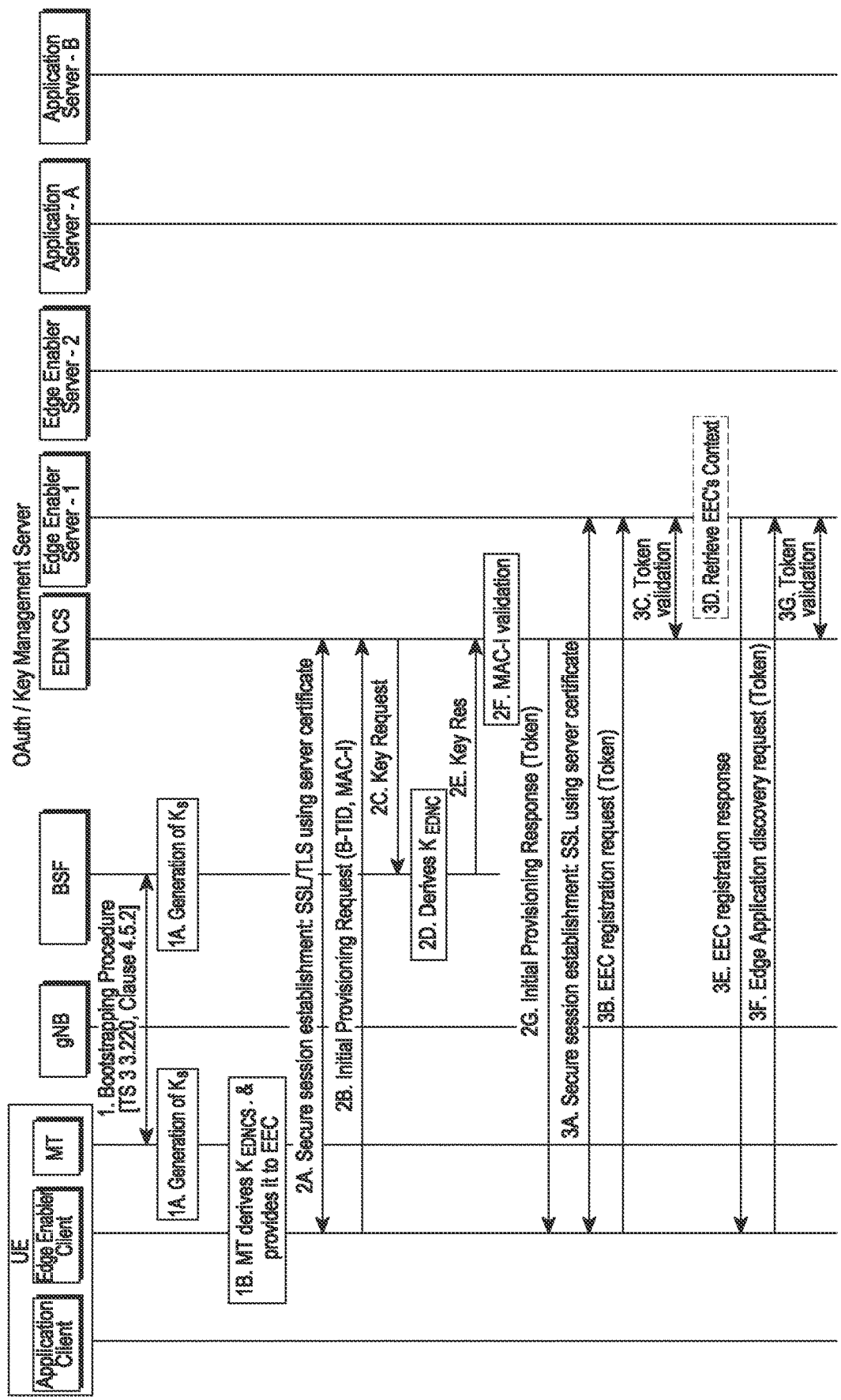
FIG. 8 is an example sequence diagram depicting the flow of information between different elements of the architecture, wherein the ECS acts as the Open Authorization Server for rendering of the MEC services, according to embodiments as disclosed herein.
Figure 8B:
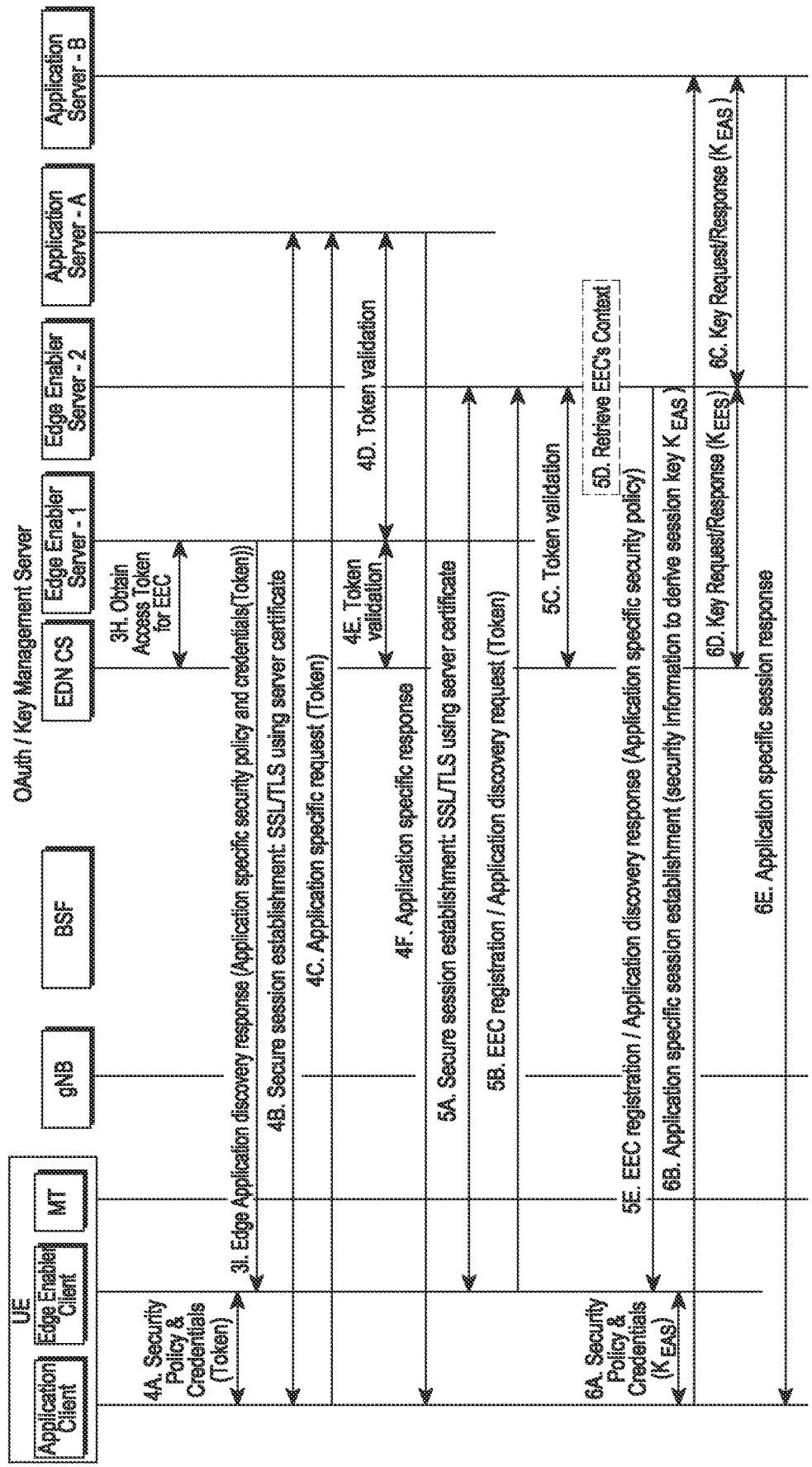

FIG. 8 is an example sequence diagram depicting the flow of information between different elements of the architecture, wherein the ECS 110 acts as the Open Authorization Server for rendering of the MEC services, according to embodiments as disclosed herein. In this example, the EDN CS represents the ECS 110. There is a single application client (application) in the UE 101 that is availing MEC services from EAS-A (112) and EAS-B (112). The EES-1 (111) and EAS-A (112) can be considered as part of a first EDN (109). The EES-2 (111) and EAS-B (112) are considered as part of a second EDN (109).

Step 1: The UE 101 performs Bootstrapping procedures as defined in 3GPP specifications.

Step 1A: At the end of the GBA Bootstrapping procedures, the UE 101 and the BSF 701 are in possession of a key $K_S$. The UE 101 derives the key $K_{ECS}$ (edge authentication key), for availing MEC service, based on ECS 110 specific parameters (such as Network Application Function (NAF) Identity (ID)).

Step 2A: The UE 101 (EEC 103) can establish a SSL/TLS session with the ECS 110, to secure the communication.

Step 2B-2G: The UE 101 can initiate MEC service provisioning procedure with the ECS 110. The UE 101 can send an initial provisioning request message to the ECS 110 to initiate the MEC service provisioning procedure. The UE 101 includes a Bootstrapping Transaction Identifier (B-TID) and a MAC-I in the initial provisioning request message. The MAC-I is generated by the UE 101 using the initial provisioning request message and the key $K_{ECS}$ to prove its authenticity. The B-TID is used to bind the subscriber identity to the keying material in reference points Ua, Ub and Zn.

The ECS 110 contacts the BSF 701 (using B-TID) to obtain the key $K_{ECS}$ ($K_{S-NAF}$) generated by the UE 101. The key $K_{ECS}$ is used by the ECS 110 to verify the MAC-I and provide an initial provisioning response. If the UE 101 is authorized to access the EES-1 (111), then the ECS 110 generates EES access token and provides the access token to the UE 101 using a secure channel (the EES token is encrypted using the $K_{ECS}$ or using further derived keys).

In an embodiment, the UE 101 can additionally include an Authentication Token (AUSF Token) to prove its authenticity (possession of the valid key $K_{AUSF}$). On receiving the AUSF Token the ECS 110 can provide the AUSF Token to the AAnF 106 in the key request message (Step 2D). The AAnF 106 verifies the AUSF Token after receiving key $K_{AKMA}$ in step 2G. If the verification of the AUSF Token is successful, the AAnF 106 proceeds with steps (3A to 6D). If the verification of the AUSF Token is unsuccessful, the AAnF 106 provides, to the ECS 110, an appropriate error cause in a reject message to the UE 101.

The flow of information between different elements of the architecture in steps 3A-6E is identical to the flow of information between different elements of the architecture in the steps 3A-6E described in FIG. 6.

Therefore, for the sake of brevity, the steps 3A-6E is not repeated here.

Figure 9:
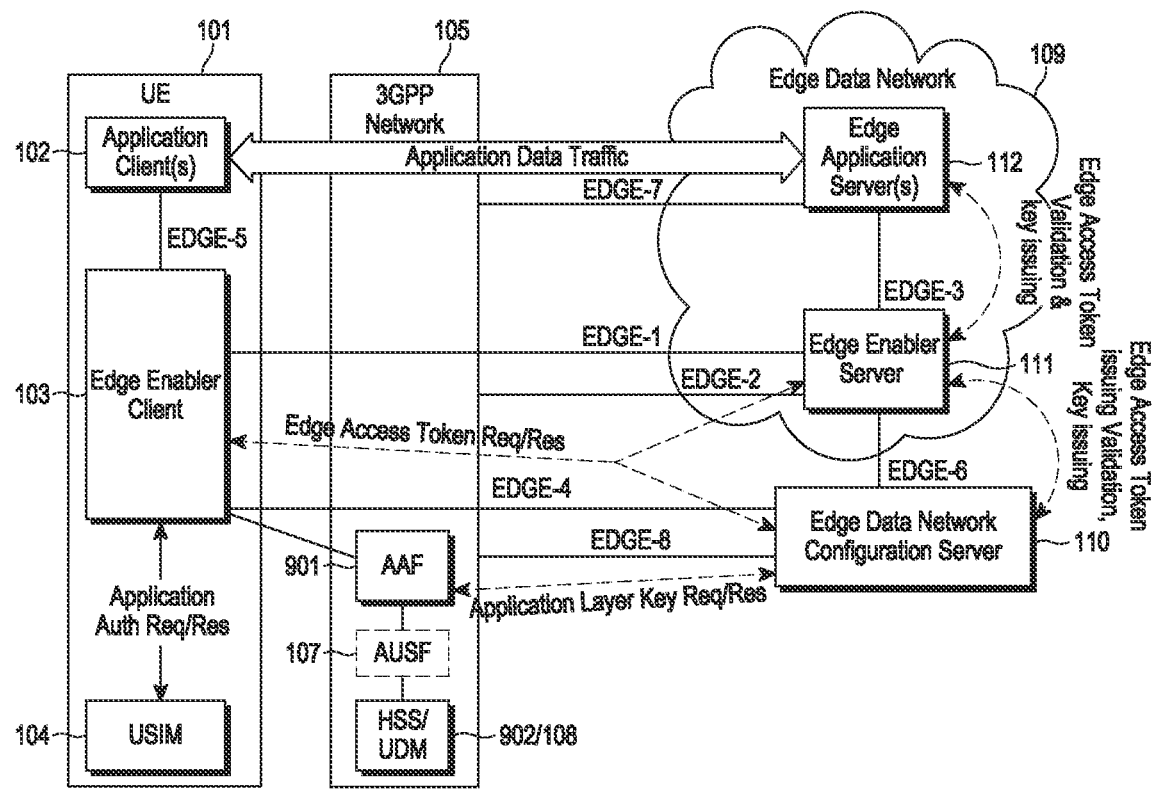
FIG. 9 depicts an example architecture for rendering MEC services to the UE through a 5G network with SA or NSA architecture, wherein the UE is authenticated and authorized, for rendering specific MEC services, using application layer procedures, according to embodiments as disclosed herein.

FIG. 9 depicts an example architecture for rendering MEC services to the UE 101 through a 5G network with SA or NSA architecture, wherein the UE 101 is authenticated and authorized, for rendering specific MEC services, using application layer procedures, according to embodiments as disclosed herein. As depicted in FIG. 9, the architecture comprises the UE 101, the 3GPP network 105, the EDN 109, and the ECS 110. The UE 101 comprises at least one application client 102, the EEC 103, and the Modem 104. The at least one application client 102 can refer to at least one edge application installed in the UE 101. The 3GPP network 105 in the architecture can be a 5G network with SA architecture or NSA architecture. The 3GPP network 105 includes an Authentication and Authorization Function (AAF) 901, an AUSF 107, and a Home Subscriber System (HSS) 902 or a UDM 108. The EDN 109 comprises the EES 111 and the at least one EAS 112. The EAS 112 provides MEC services to the UE 101.

5$^{th}$ embodiment: This embodiment is represented in the architecture depicted in FIG. 9. In this embodiment, the MEC specific authentication and authorization and does not use GBA and AKMA. The architecture is applicable for SA architecture and NSA architecture, as the interface between the EEC 103 and the AAF 901 for example, is a Hyper-Text Transport Protocol (HTTP) interface (over Long Term Evolution (LTE) or 5G user plane). The EEC 103 and the AAF 901 support HTTP Digest Authentication and Key Agreement (AKA) protocol, which uses network access credentials residing in the USIM (in the UE 101) and in the HSS (LTE)/UDM (5GC) 903 (in the Evolved Packet Core (EPC) or 5GC). After successful authentication procedure, the MEC application specific key is derived from the AKA keys (CK and IK), as defined in 3GPP specifications.

If support for NSA is not required, then the EEC 103 and the AAF 901 perform secondary authentication procedure (as defined in 3GPP specifications), to perform mutual authentication, authorization and secure session establishment. The EDN is considered as a Data network.

The ECS 110 issues EES tokens and provides the EES tokens to the UE 101. The UE 101 provides the EES tokens to the EES 111 for getting authorized by the EES 111. The EES 111 verifies the EES tokens to authorize the UE 101 for allowing the UE 101 to register with the EES 111 and allow the UE 101 to discover an EAS 112 that is providing the MEC services intended by the UE 101. The EES 111 verifies the EES tokens with the aid of the ECS 110. The EAS 112 verifies the EAS access tokens, received from the UE 101, with the aid of the ECS 110. The ECS 110 provides EAS access credentials, pertaining to the EAS 112 providing the intended MEC services, to the EES 111. These access credentials allow the UE 101 to access the EAS 112 for availing MEC services. The EAS 112 verifies the EAS access credentials, received from the UE 101, with the aid of ECS 110, for rendering the MEC services to the UE 101.

Figure 10A:
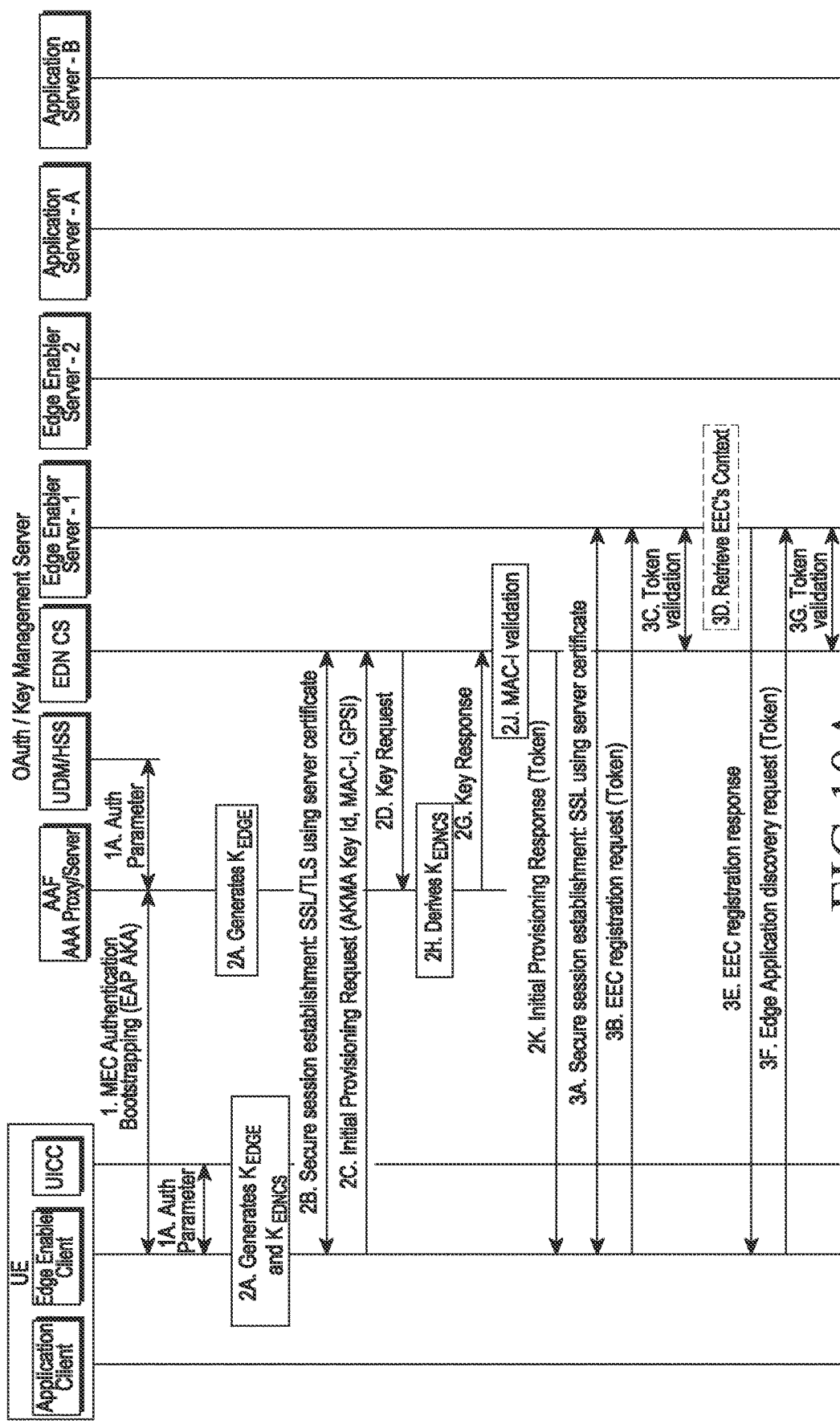
FIG. 10 is an example sequence diagram depicting the flow of information between different elements of the architecture, wherein the ECS acts as the Open Authorization Server for rendering of the MEC services, wherein the UE is authenticated and authorized, for rendering specific MEC services, using application layer procedures, according to embodiments as disclosed herein.
Figure 10B:
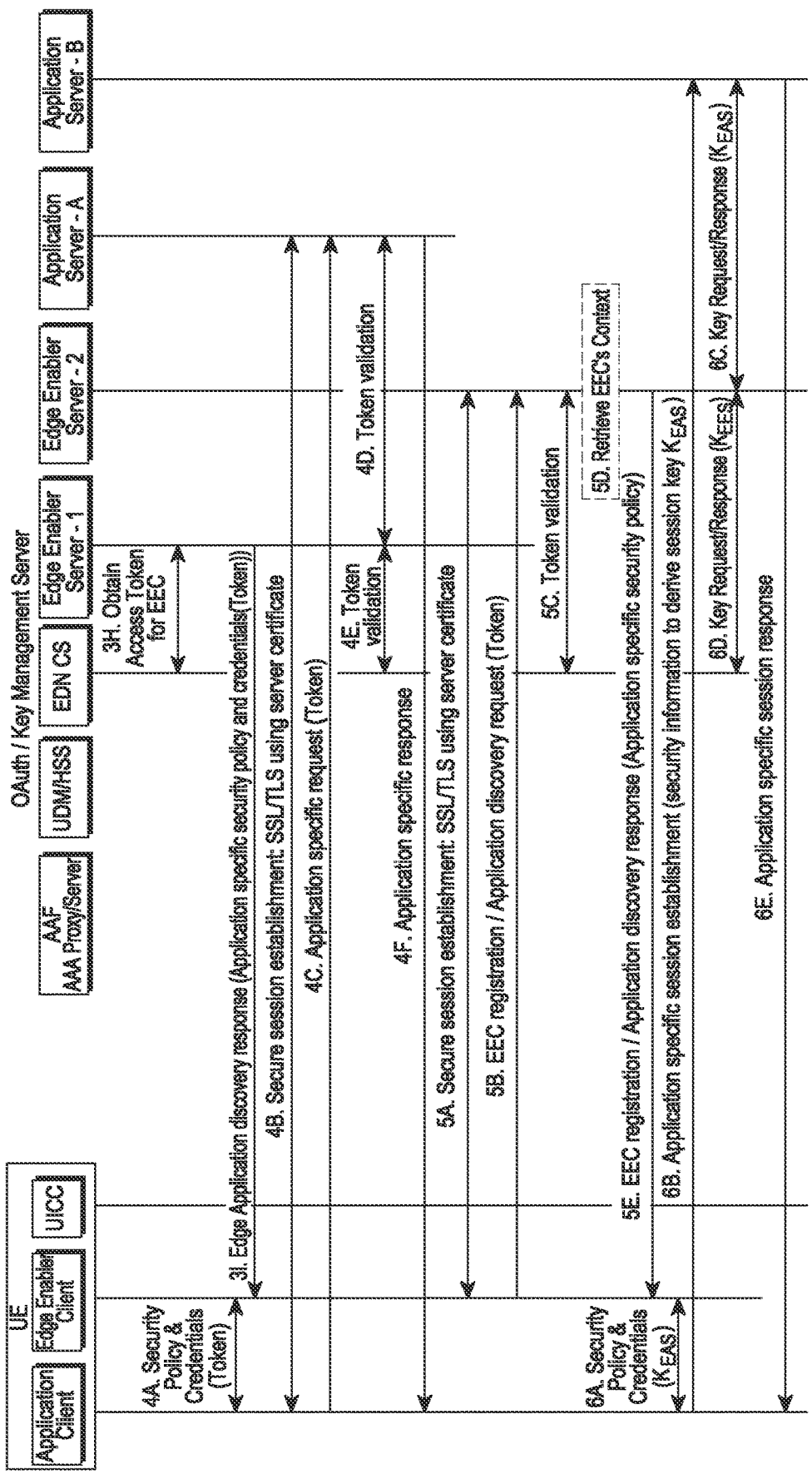

FIG. 10 is an example sequence diagram depicting the flow of information between different elements of the architecture, wherein the ECS 110 acts as the Open Authorization Server for rendering of the MEC services (in other words, the OAuth server is co-located with the ECS 110), wherein the UE 101 is authenticated and authorized, for rendering specific MEC services, using application layer procedures, according to embodiments as disclosed herein. In this example, the EDN CS represents the ECS 110. There is a single application client (application) in the UE 101 that is availing MEC services from EAS-A (112) and EAS-B (112). The EES-1 (111) and EAS-A (112) can be considered as part of a first EDN (109). The EES-2 (111) and EAS-B (112) are considered as part of a second EDN (109).

The AAF 901 can derives the edge authentication key ($K_{ECS}$) using at least one of an edge key ($K_{EDGE}$) and a Generic Public Subscription Identifier (GPSI). The edge key $K_{EDGE}$ is derived, by the AAF 901, using 3GPP network access security credentials of the UE 101. The GPSI corresponds to the 3GPP network access security credentials of the UE 101.

The UE 101 and the EDN 109 perform application layer specific authentication procedure (for example, EAP-AKA, TLS, HTTP-AKA, HTTPs). The security credentials used to perform application layer authentication may or may not use the 5G primary authentication procedure, but using an isolated security credentials shared between the UE 101 and the EDN 109 (for example, in AAA server in the EDN 109). Upon successful authentication, EDGE specific keys are generated from the authentication procedure established keys. For illustrative example, if EAP-AKA is used as the authentication method, then the generated MSK or EMSK is used as the $K_{EDGE}$ key and further keys ($K_{ECS}$) are derived from the key $K_{EDGE}$. In an embodiment, the UE 101 and the EDN 109 performs the secondary authentication procedure (defined in the 3GPP specification), which is initiated by the 3GPP network (for example, Session Management Function (SMF)) during Protocol Data Unit (PDU) session establishment procedure (as defined in the 3GPP specification).

The flow of information between different elements of the architecture in steps 3A-6E is identical to the flow of information between different elements of the architecture in the steps 3A-6E described in FIG. 6.

Therefore, for the sake of brevity, the steps 3A-6E is not repeated here.

Figure 11:
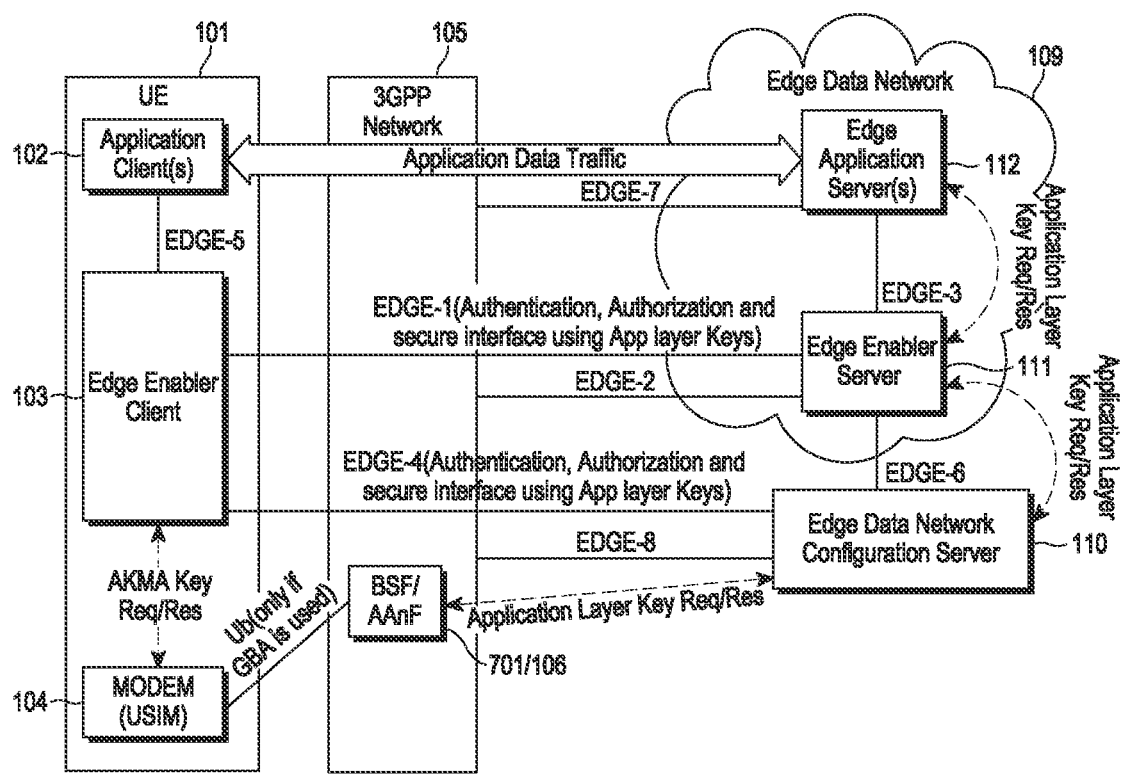
FIG. 11 depicts an example architecture for rendering MEC services to the UE through a 5G network with a NSA architecture, wherein the UE is authenticated and authorized, for rendering specific MEC services, using application layer keys, according to embodiments as disclosed herein.

FIG. 11 depicts an example architecture for rendering MEC services to the UE 101 through a 5G network with a NSA architecture, wherein the UE 101 is authenticated and authorized, for rendering specific MEC services, using application layer keys, according to embodiments as disclosed herein. As depicted in FIG. 11, the architecture comprises the UE 101, the 3GPP network 105, the EDN 109, and the ECS 110. The UE 101 comprises at least one application client 102, the EEC 103, and the Modem 104. The at least one application client 102 can refer to at least one edge application installed in the UE 101. The 3GPP network 105 in the architecture can be a 5G network with NSA architecture. The 3GPP network 105 includes the BSF 701 or the AAnF 106. The EDN 109 comprises the EES 111 and the at least one EAS 112. The EAS 112 provides MEC services to the UE 101.

$6^{th}$ embodiment: This embodiment is represented in the architecture depicted in FIG. 11. In this embodiment, application layer keys are generated by the UE 101 for interacting with each of the ECS 110, the EES 111, and the EAS 112. The architecture is applicable for providing MEC services to the UE 101 through a 5G NSA architecture. The UE 101 can directly connect with the ECS 110, the EES 111, and the EAS 112, once the UE 101 has been authenticated using 3GPP network access security credentials of the UE 101. The embodiment does not require introducing modifications in AKMA or GBA entities to generate the application keys.

Figure 12A:
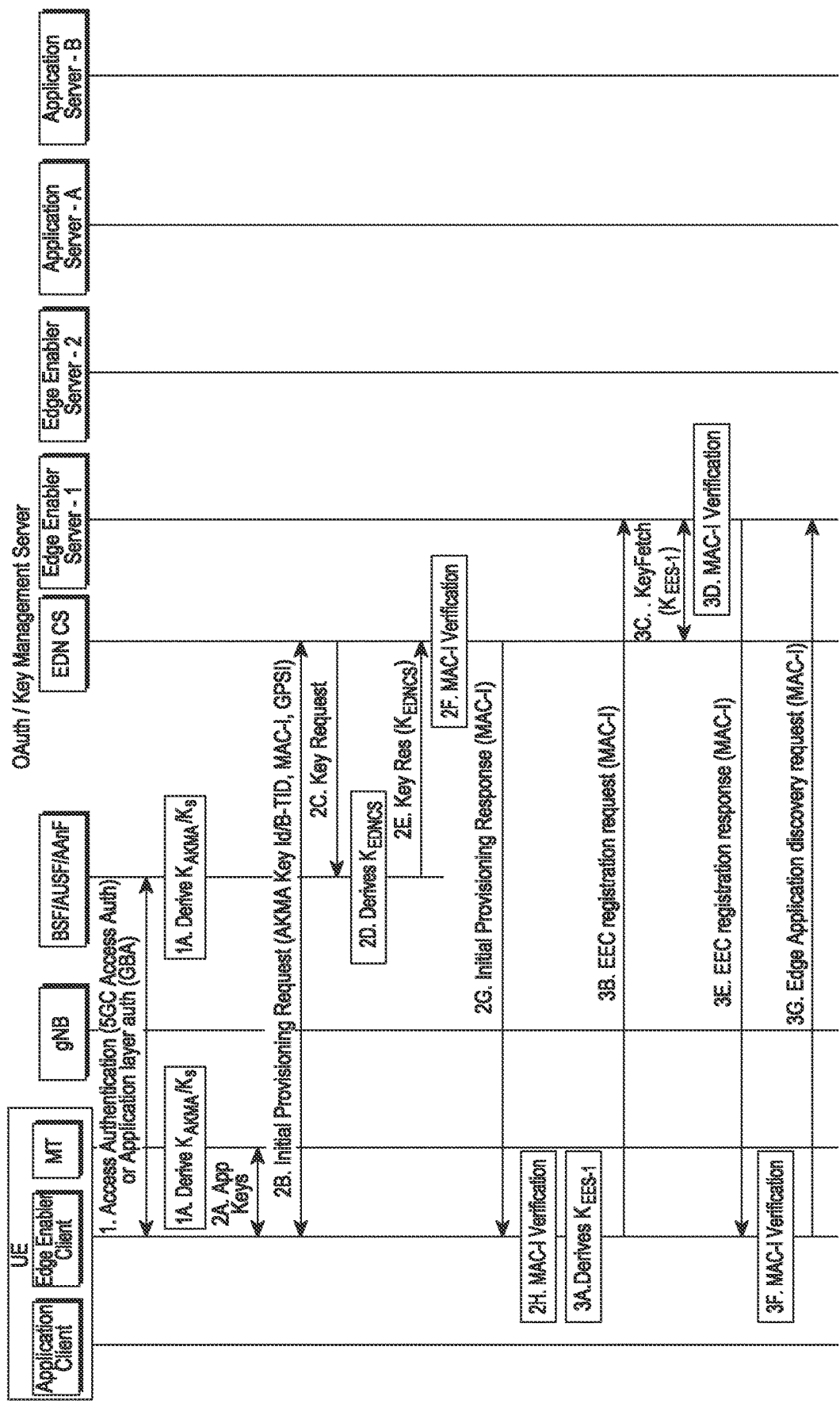
FIG. 12 is an example sequence diagram depicting the flow of information between different elements of the architecture, wherein the ECS acts as the Open Authorization Server for rendering of the MEC services, wherein the UE is authenticated and authorized, for rendering specific MEC services, using application layer keys, according to embodiments as disclosed herein.
Figure 12B:
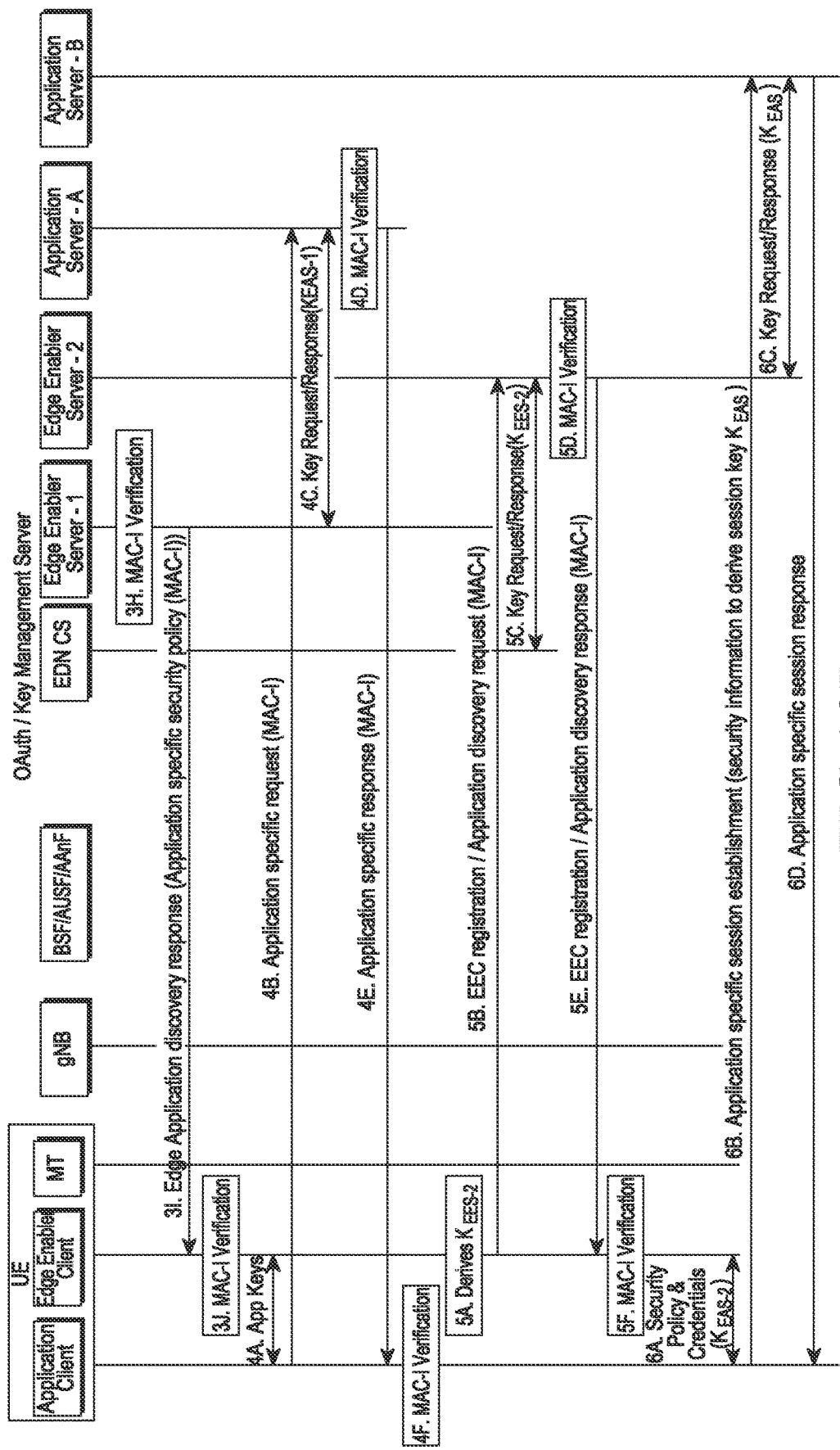

FIG. 12 is an example sequence diagram depicting the flow of information between different elements of the architecture, wherein the ECS 110 acts as the Open Authorization Server for rendering of the MEC services, wherein the UE 101 is authenticated and authorized, for rendering specific MEC services, using application layer keys, according to embodiments as disclosed herein. In this example, the EDN CS represents the ECS 110. There is a single application client (application) in the UE 101 that is availing MEC services from EAS-A (112) and EAS-B (112). The EES-1 (111) and EAS-A (112) can be considered as part of a first EDN (109). The EES-2 (111) and EAS-B (112) are considered as part of a second EDN (109).

Step 1: The UE 101 performs authentication procedures as defined in 3GPP specifications (Primary authentication and key agreement) to obtain access to a 5G Core (NSA) network and generate application specific keys ($K_s$). Additional keys such as $K_{AUSF}$ and $K_{AKMA}$ may be generated as well. In an embodiment, the UE 101 performs application specific authentication as defined in 3GPP specifications (GBA) to bootstrap the application specific keys ($K_S$).

Step 2A: The UE 101 can derive the application keys, based on the security credentials established as part of authentication procedure (for example, from $K_S$, $K_{AUSF}$, $K_{AKMA}$).

Step 2B: The UE 101 can send an initial provisioning request to the ECS 110. The initial provisioning request comprises at least one of: an AKMA key ID, B-TID, MAC-I, and GPSI.

Steps 2C-2H: In order to authenticate the UE 101, the ECS 110 requests for $K_{ECS}$ key (edge authentication key) from at least one of the BSF 701, AUSF 107, and the AAnF 106. The at least one of the BSF 701, AUSF 107, and the AAnF 106 generates the $K_{ECS}$ key based on the 3GPP network access security credentials of the UE 101. The $K_{ECS}$ key is provided to the ECS 110, wherein the ECS 110 validates the MAC-I generated by the UE 101 using $K_{ECS}$. Once the MAC-I is validated, the ECS 110 provides an initial provisioning response to the UE 101, which includes a MAC-I. The MAC-I is generated using the $K_{ECS}$ and the initial provisioning response The UE 101 verifies a MAC-I, received from the ECS 110, using the $K_{ECS}$ generated by the UE 101.

Steps 3A-3J: The UE 101 generates a key $K_{EES\text{-}1}$, for accessing the EES-1 (111), using the $K_{ECS}$. The UE 101 sends a MEC registration request (EEC 103 registration request) along with a MAC-I to the EES-1 (111). The MAC-I is generated by the UE 101 using the key $K_{EES\text{-}1}$ (or keys generated further using $K_{EES\text{-}1}$) and the MEC registration request message. In order to verify the MAC-I, the EES-1 (111) can fetch the key $K_{EES\text{-}1}$ from the ECS 110. Once the EES-1 (111) obtains the key $K_{EES\text{-}1}$ from the ECS 110 (ECS 110 generates the $K_{EES\text{-}1}$ in same way as the UE 101 using the $K_{ECS}$), the EES-1 (111) validates the MAC-I (by generating MAC-I using the key $K_{EES\text{-}1}$ (or keys generated further using $K_{EES\text{-}1}$) and the received MEC registration request message). The EES-1 (111) can send an EEC registration response to the UE 101, which includes a MAC-I (MAC-I is generated by the EES-1 (111) using the key $K_{EES\text{-}1}$ (or keys generated further using $K_{EES\text{-}1}$) and the EEC registration response message). The UE 101 can validate the MAC-I received from the EES-1 (111) in the EEC registration response (by generating a MAC-I using the key $K_{EES\text{-}1}$ (or keys generated further using $K_{EES\text{-}1}$) and the received MEC registration response message).

The UE 101 sends a MEC discovery request (Edge application discovery request) along with a MAC-I. The MAC-I is generated by the UE 101 using the key $K_{EES\text{-}1}$ (or keys generated further using $K_{EES\text{-}1}$) and the MEC discovery request message. The EES-1 (111) verifies the MAC-I and sends an Edge application discovery response to the UE 101, which includes a MAC-I. The MAC-I is generated by the EES-1 (111) using the key $K_{EES\text{-}1}$ (or keys generated further using $K_{EES\text{-}1}$) and the Edge application discovery response message. The Edge application discovery response includes security policy pertaining to at least one EAS 112 providing the MEC services intended by the UE 101. The Edge application discovery response further includes access credentials to access the at least one EAS 112. The UE 101 verifies the MAC-I included in the Edge application discovery response.

Steps 4A-4F: The UE 101 utilizes an application key $K_{EAS\text{-}A}$ for accessing the EAS-A (112). The UE 101 generates a key $K_{EAS\text{-}A}$ for accessing the EAS-A (112) using the $K_{EES\text{-}1}$. The UE 101 and sends a MEC application request (application specific request) along with the MAC-I to the EAS-A (112), for receiving the intended MEC services from the EAS-A (111). The MAC-I is generated by the UE 101 using the key $K_{EAS\text{-}A}$ (or keys generated further using $K_{EAS\text{-}A}$) and the MEC application request message. In order to verify the MAC-I, the EAS-A (112) can fetch the key $K_{EAS\text{-}A}$ from the EES-1 111. The EES-1 (111) generates the $K_{EAS\text{-}A}$ in same way as the UE 101 using the $K_{EES\text{-}1}$). Once the EAS-A (112) obtains the key $K_{EAS\text{-}A}$ from the EES-1 (111), the EAS-A (112) validates the MAC-I. The EAS-A (112) can send an application specific response to the UE 101, which includes the MAC-I, for providing the intended MEC services to the UE 101. The UE 101 can validate the MAC-I received from the EAS-A (112) in the application specific response.

Steps 5A-5F: The UE 101 derives a key $K_{EES\text{-}2}$ for accessing the EES-2 (111). The UE 101 sends a MEC registration request (EEC 103 registration request) along with a MAC-I to the EES-2 (111). In order to verify the MAC-I, the EES-1 (111) can fetch the key $K_{EES\text{-}2}$ from the ECS 110. Once the EES-2 (111) obtains the key $K_{EES\text{-}2}$ from the ECS 110, the EES-1 (111) validates the MAC-I. The EES-1 (111) can send an EEC registration response to the UE 101, which includes the MAC-I. The UE 101 can validate the MAC-I received from the EES-1 (111) in the EEC registration response. The UE 101 and ECS 101 generate the key $K_{EES-2}$ using the key $K_{ECS}$ in the same way as $K_{EES-1}$ is generated. Further, the UE 101 generates MAC-I using the key $K_{EES-2}$ (or keys generated further using $K_{EES-2}$) and the MEC registration request message. The EES-2 (111) generates MAC-I using the key $K_{EES-2}$ (or keys generated further using $K_{EES-2}$) and the EEC registration response message.

The UE 101 sends a MEC discovery request (Edge application discovery request) along with the MAC-I. The EES-2 (111) verifies the MAC-I and sends an Edge application discovery response to the UE 101, which includes the MAC-I. The Edge application discovery response includes security policy pertaining to at least one EAS 112 providing the MEC services intended by the UE 101. The Edge application discovery response further includes access credentials to access the at least one EAS 112. The UE 101 verifies the MAC-I included in the Edge application discovery response. The UE 101 generates MAC-I using the key $K_{EES-2}$ (or keys generated further using $K_{EES-2}$) and the MEC discovery request message. The EES-2 (111) generates MAC-I using the key $K_{EES-2}$ (or keys generated further using $K_{EES-2}$) and the Edge application discovery response.

Steps 6A-6D: The UE 101 utilizes an application key $K_{EAS-B}$ for accessing the EAS-B (112). The UE 101 and sends a MEC application request (application specific request) along with the MAC-I to the EAS-B (112), for receiving the intended MEC services from the EAS-B (111). In order to verify the MAC-I, the EAS-B (112) can fetch the key $K_{EAS-B}$ from the EES-2 111. Once the EAS-N(112) obtains the key $K_{EAS-B}$ from the EES-2 111, the EAS-B (112) validates the MAC-I. The EAS-B (112) can send an application specific response to the UE 101, which includes the MAC-I, for providing the intended MEC services to the UE 101. The UE 101 can validate the MAC-I received from the EAS-B (112) in the application specific response. The UE 101 and EES-2 (111) generates the key $K_{EAS-B}$ using the key $K_{EES-2}$ in the same way as the UE 101 and the EES-1 (111) had generated the key $K_{EAS-A}$ using the key $K_{EES-1}$.

$$K_{ECS}=KDF\{K_{AKMA}, \text{other possible parameters}\}$$

$$K_{EES-1}=KDF\{K_{ECS}, \text{other possible parameters}\}$$

$$K_{EES-2}=KDF\{K_{ECS}, \text{other possible parameters}\}$$

$$K_{EAS-A}=KDF\{K_{EES-1}, \text{other possible parameters}\}$$

$$K_{EAS-B}=KDF\{K_{EES-2} \text{ other possible parameters}\}$$

FIGS. 1, 3, 5, 7, 9, and 11, show exemplary unit of the architecture, but it is to be understood that other embodiments are not limited thereon. In other embodiments, the architecture may include less or more number of units. Further, the labels or names of the units of the architecture are used only for illustrative purpose and does not limit the scope of the invention. One or more units can be combined together to perform same or substantially similar function in the architecture.

Figure 13:
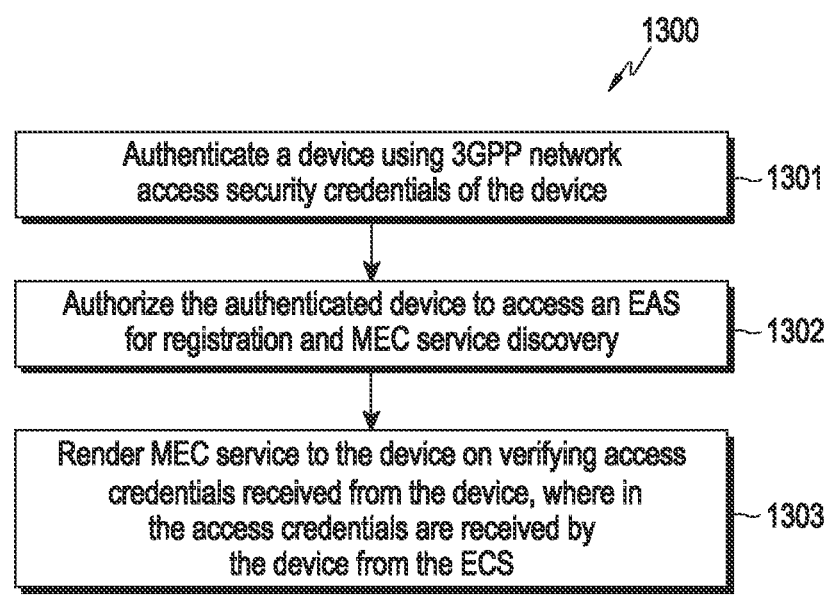
FIG. 13 is a flowchart depicting a method for providing MEC services to the device through a 5G SA/NSA network architecture, according to embodiments as disclosed herein.

FIG. 13 is a flowchart 1300 depicting a method for providing MEC services to the device through a 5G SA/NSA network architecture, according to embodiments as disclosed herein. At step 1301, the method includes authenticating the device using 3GPP network access security credentials of the device. The device can be authenticated by the ECS by validating a MAC generated by the device. In an embodiment, the ECS can validate the MAC using an edge authentication key, wherein the edge authentication key is generated based on the 3GPP network access security credentials of the device.

In an embodiment, the edge authentication key is generated by the AAnF using an AKMA key, if the device is connected to 5G SA network architecture. The AKMA key is derived, by the AUSF, using an AKMA ID corresponding to the UE. The AKMA ID can correspond to a security context established using the 3GPP network access security credentials of the device. The AAnF can provide the generated edge authentication key to the ECS. The ECS can utilize the edge authentication key to validate the UE.

In an embodiment, the AAnF can provide an EES token to the device after the successful authentication of the device by the ECS. In another embodiment, the AAnF can provide an EES token to the ECS. The ECS can send the EES token to the device if the device is successfully authenticated by the ECS. In yet another embodiment, the ECS can provide an EES token to the device after authenticating the device.

In an embodiment, the edge authentication key is derived by the BSF, if the device is connected to 5G NSA network architecture. The edge authentication key is derived using the 3GPP network access security credentials of the device and the BT-ID. In an embodiment, the BT-ID corresponds to the 3GPP network access security credentials of the device. The ECS can send the EES token to the device if the device is successfully authenticated by the ECS.

In an embodiment, the edge authentication key is derived by the AAF, if the device is connected to 5G SA/NSA network architecture. The edge authentication key is derived using at least one of an edge key and the GPSI. In an embodiment, the edge key is derived using the 3GPP network access security credentials of the device. The GPSI corresponds to the 3GPP subscription data and used to identify the security context established using the network access security credentials of the device. The ECS can send the EES token to the device if the device is successfully authenticated by the ECS.

At step 1302, the method includes authorizing the authenticated device to access an EAS for registration and MEC service discovery. The device can be authorized to receive the MEC services if the device is able to successfully register with the EES. The EES can register the device if the device is able to provide a valid EES token to the EES during the registration procedure. The device can send a MEC service registration request to the EES, which includes an EES token. The EES can determine whether the EES token received in the MEC service registration request is valid. The EES can determine that the EES token, received in the MEC service registration request, is valid, by ensuring the integrity of the token by verifying the signature using token issuer's public key or checking the MAC value using the shared secret. If integrity check is successful, then the claims in the token are verified by checking one of: the claim in the access token matches UE's own identity and the scope match the requested service operation.

In an embodiment, the EES can send the EES token, received in the MEC service registration request to the AAnF. The AAnF validates the EES token, included in the MEC service registration request. If the EES token is validated by the AAnF, the AAnF sends edge context of the device to the EES. This allows the device to successfully register with the EES.

In another embodiment, the EES can send the EES token, received in the MEC service registration request to the ECS for validation of the EES token. The ECS validates the EES token, included in the MEC service registration request. The ECS can determine that the EES token, received in the MEC service registration request, is valid, by ensuring the integrity of the token by verifying the signature using token issuer's public key or checking the MAC value using the shared secret. If integrity check is successful, then the claims in the token are verified by checking one of: the claim in the access token matches UE's own identity and the scope matches the requested service operation. It is to be noted that the ECS had received the EES token from the AAnF and provided the same EES token to the device.

In case the EES token is not valid (validity time in the access token is elapsed), the ECS can provide another EES token to the device to enable the device to register with the EES. The device can request the ECS to reissue the EES token. The ECS can resend the EES token (which was received by the ECS from the AAnF) to the device. Thereafter, the device can send MEC service registration request to the EES for registration.

In yet another embodiment, the EES can send the EES token, received in the MEC service registration request to the ECS for validation of the EES token. The ECS validates the EES token, included in the MEC service registration request. The ECS can determine that the EES token, received in the MEC service registration request, is valid, by ensuring the integrity of the token by verifying the signature using token issuer's public key or checking the MAC value using the shared secret. If integrity check is successful, then the claims in the token are verified by checking one of: the claim in the access token matches UE's own identity and the scope matches the requested service operation. Once the EES token included in the MEC service registration request is validated, the device is successfully registered with the EES.

Once the device is successfully registered with the EES, the EES can provide security policies pertaining to an EAS, which is found to be providing desired MEC services to the device. The EES can also provide credentials to the device for accessing the EAS that is providing the desired MEC services to the device. In an embodiment, the EAS access credentials can be EAS access token. In an embodiment, the credentials can be EAS access key. The EES sends the security policies and the EAS access credentials to the device if a MEC service discovery request, received by the EES from the device, is validated.

The registered device can send the MEC service discovery request to the EES to discover an EAS that is providing the desired MEC service and is also closest (by geographical location) to the device. The device includes the EES token in the MEC service discovery request, which was received from the ECS after authentication of the device, and sends the MEC service discovery request to the EES.

In an embodiment, the EES can send the EES token, received in the MEC service discovery request to the AAnF for validation. The AAnF validates the EES token. If the EES token is validated by the AAnF, the AAnF sends the security policies and the EAS access credentials to the EES. Thereafter, the EES can send the security policies and the EAS access credentials to the device.

In another embodiment, the EES can send the EES token, received in the MEC service discovery request to the ECS for validation. The ECS validates the EES token. If the EES token is validated by the ECS, the ECS sends the security policies and the EAS access credentials to the EES. Thereafter, the EES can send the security policies and the EAS access credentials to the device.

In yet another embodiment, the EES can send the EES token, received in the MEC service discovery request to the ECS for validation. The ECS validates the EES token. If the EES token is validated by the ECS, the ECS sends the security policies and the EAS access credentials to the EES. Thereafter, the EES can send the security policies and the EAS access credentials to the device.

At step 1303, the method includes providing the MEC services to the device on verifying access credentials received from the device, wherein the access credentials are received by the device from the EAS during the authorization of the device. The MEC services are rendered to the device on verifying access credentials received from the device, wherein the access credentials are received by the device from at least one of the EDN, ECS, AAnF and OAuth server. The access credentials can also be generated by the device using 3GPP network access security credentials.

The device can send a MEC service request to the EAS for availing the desired MEC services from the EAS. The device can send the EAS access credentials, received from the EES, to the EAS in the MEC service request. The EAS can provide the MEC services to the device if the access credentials received by the EAS in the MEC service request are verified.

In an embodiment, the EAS can send the EAS access credentials, received from the device, to the AAnF for verification of EAS the access credentials. If the verification of the access credentials is successful, thereafter, the EAS can provide the desired MEC services to the device.

In another embodiment, the EAS can send the EAS access credentials, received from the device, to the EES. The EES can forward the EAS access credentials to the AAnF for verification of EAS the access credentials. If the verification of the access credentials is successful, thereafter, the EAS can provide the desired MEC services to the device.

In yet another embodiment, the EAS can send the EAS access credentials, received from the device, to the EES. The EES can forward the EAS access credentials to the ECS for verification of EAS the access credentials. If the verification of the access credentials is successful, thereafter, the EAS can provide the desired MEC services to the device.

The various actions in the flowchart 1300 may be performed in the order presented, in a different order, or simultaneously. Further, in some embodiments, some actions listed in FIG. 13 may be omitted.

The embodiments disclosed herein can be implemented through at least one software program running on at least one hardware device and performing network management functions to control the network elements. The network elements shown in FIGS. 1, 3, 5, 7, 9, and 11, include blocks which can be at least one of a hardware device, or a combination of hardware device and software module.

The embodiments disclosed herein describe methods and systems for proving MEC services to the UE through a 3GPP network using 3GPP network access security credentials of the UE. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by an edge configuration server (ECS) for providing multi-access edge computing (MEC) services to a user equipment (UE) using a wireless network, the method comprising:
   authenticating an edge enabler client (EEC) of the UE by establishing a security session with the EEC, based on an edge authentication key of the EEC;
   generating at least one edge enabler server (EES) access token to be used to access to an EES; and
   transmitting, to the EEC, a service response message including the at least one EES access token,
   wherein the at least one EES access token is included in a registration request of the EEC to the EES.

2. The method of claim 1,
   wherein the edge authentication key comprises an authentication and key agreement for applications (AKMA) application key, and
   wherein the AKMA application key is generated based on an AKMA indication corresponding to the EEC.

3. The method of claim 1, wherein the at least one EES access token enables the UE to register with the EES to receive a service.

4. The method of claim 1, wherein the security session comprises a transport layer security (TLS) session.

5. A method performed by an edge enabler client (EEC) of a user equipment (UE) for providing multi-access edge computing (MEC) services to the UE using a wireless network, the method comprising:
   establishing a security session with an edge configuration server (ECS) based on an authentication of the ECS using an edge authentication key of the EEC;
   receiving, from the ECS, a service response message including at least one edge enabler server (EES) access token used to access to an EES; and
   transmitting, to the EES, a registration request including the at least one EES access token,
   wherein the at least one EES access token is generated by the ECS.

6. The method of claim 5,
   wherein the edge authentication key comprises an authentication and key agreement for applications (AKMA) application key and
   wherein the AKMA application key is generated based on an AKMA indication corresponding to the EEC.

7. The method of claim 5, wherein the at least one EES access token enables the UE to register with the EES to receive a service.

8. The method of claim 5, wherein the security session comprises a transport layer security (TLS) session.

9. An edge configuration server (ECS) for providing multi-access edge computing (MEC) services to a user equipment (UE) using a wireless network, the ECS comprising:
   a transceiver; and
   at least one processor coupled to the transceiver and configured to:
      authenticate an edge enabler client (EEC) of the UE by establishing a security session with the EEC, based on an edge authentication key of the EEC,
      generate at least one edge enabler server (EES) access token to be used to access to an EES, and
      transmit, to the EEC, a service response message including the at least one EES access token,
   wherein the at least one EES access token is included in a registration request of the EEC to the EES.

10. The ECS of claim 9,
    wherein the edge authentication key comprises an authentication and key agreement for applications (AKMA) application key, and
    wherein the AKMA application key is generated based on an AKMA indication corresponding to the EEC.

11. The ECS of claim 9, wherein the at least one EES access token enables the UE to register with the EES to receive a service.

12. The ECS of claim 9, wherein the security session comprises a transport layer security (TLS) session.

13. An edge enabler client (EEC) of a user equipment (UE) for providing multi-access edge computing (MEC) services to the UE using a wireless network, the EEC comprising:
    a transceiver; and
    at least one processor coupled to the transceiver and configured to:
       establish a security session with an edge configuration server (ECS) based on an authentication of the ECS using an edge authentication key of the EEC,
       receive, from the ECS, a service response message including at least one edge enabler server (EES) access token used to access to an EES, and
       transmit, to the EES, a registration request including the at least one EES access token,
    wherein the at least one EES access token is generated by the ECS.

14. The EEC of claim 13,
    wherein the edge authentication key comprises an authentication and key agreement for applications (AKMA) application key and
    wherein the AKMA application key is generated based on an AKMA indication corresponding to the EEC.

15. The EEC of claim 13,
    wherein the at least one EES access token enables the UE to register with the EES to receive a service, and
    wherein the security session comprises a transport layer security (TLS) session.

* * * * *